(12) United States Patent (10) Patent No.: US 9,294,744 B2
Takeda (45) Date of Patent: *Mar. 22, 2016

(54) IMAGE SENSOR AND IMAGE SENSING APPARATUS WITH PLURAL VERTICAL OUTPUT LINES

(71) Applicant: CANON KABUSHIKI KAISHA, Tokyo (JP)

(72) Inventor: Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,695

(22) Filed: Feb. 11, 2014

(65) Prior Publication Data

US 2014/0160333 A1 Jun. 12, 2014

Related U.S. Application Data

(63) Continuation of application No. 13/057,307, filed as application No. PCT/JP2009/067583 on Oct. 2, 2009, now Pat. No. 8,692,917.

(30) Foreign Application Priority Data

Oct. 22, 2008 (JP) ................................ 2008-272353

(51) Int. Cl.
*H04N 9/07* (2006.01)
*H04N 5/374* (2011.01)
*H04N 9/04* (2006.01)

(52) U.S. Cl.
CPC ............... *H04N 9/07* (2013.01); *H04N 5/3742* (2013.01); *H04N 9/045* (2013.01)

(58) Field of Classification Search
CPC ........ H04N 3/155; H04N 5/372; H04N 5/374
USPC .................................................. 348/308, 302
See application file for complete search history.

(56) References Cited

U.S. PATENT DOCUMENTS 4,945,242 A 7/1990 Berger et al.
6,690,421 B1 2/2004 Yamada et al.
(Continued)

FOREIGN PATENT DOCUMENTS

CN 1703077 A 11/2005
EP 1569278 A2 8/2005
(Continued)

OTHER PUBLICATIONS

Office Action issued in Chinese Patent Application No. 200980142275.6, dated Dec. 14, 2012.
(Continued)

*Primary Examiner* — Roberto Velez
*Assistant Examiner* — Cynthia Segura
(74) *Attorney, Agent, or Firm* — Fitzpatrick, Cella, Harper & Scinto

(57) ABSTRACT

An image sensor comprises: a pixel unit array; a driving unit; a second holding block; a first output amplifier; and a second output amplifier, each column of the pixel unit array including a plurality of first pixel units and a plurality of second pixel units, wherein the driving unit drives the pixel unit array to parallel-perform, on each column of the pixel unit array, an operation to transfer signals from the first pixel units to the first holding block via the first vertical output line, and an operation to transfer signals from the second pixel units to the second holding block via the second vertical output line.

6 Claims, 13 Drawing Sheets

(56) References Cited

U.S. PATENT DOCUMENTS

| | | |
|---|---|---|
| 6,977,684 B1 | 12/2005 | Hashimoto et al. |
| 7,256,381 B2 | 8/2007 | Asaba |
| 7,488,928 B2 * | 2/2009 | Krymski .................... 250/208.1 |
| 7,521,661 B2 | 4/2009 | Asaba |
| 7,714,904 B2 * | 5/2010 | Kudoh ....................... 348/230.1 |
| 7,777,792 B2 | 8/2010 | Yamazaki et al. |
| 8,072,521 B2 * | 12/2011 | Kato et al. .................... 348/298 |
| 8,149,308 B2 | 4/2012 | Masuyama et al. |
| 8,264,579 B2 | 9/2012 | Paik et al. |
| 2005/0128327 A1 | 6/2005 | Bencuya et al. |
| 2005/0237408 A1 * | 10/2005 | Muramatsu .................... 348/308 |
| 2005/0263677 A1 | 12/2005 | Yamazaki et al. |
| 2005/0280729 A1 | 12/2005 | Sekine |
| 2006/0132634 A1 | 6/2006 | Kudoh |
| 2007/0013798 A1 | 1/2007 | Ahn et al. |
| 2007/0030370 A1 | 2/2007 | Kang et al. |
| 2007/0257185 A1 | 11/2007 | Asaba |
| 2008/0088725 A1 | 4/2008 | Matsunaga |
| 2008/0088726 A1 * | 4/2008 | Tsukimura .................... 348/308 |
| 2008/0246865 A1 | 10/2008 | Hashimoto |
| 2008/0259178 A1 | 10/2008 | Oike |
| 2010/0020206 A1 | 1/2010 | Takeda |
| 2010/0097508 A1 * | 4/2010 | Yanagita et al. .............. 348/301 |
| 2010/0271523 A1 | 10/2010 | Hara |
| 2011/0080493 A1 * | 4/2011 | Kono et al. ................. 348/222.1 |
| 2011/0273598 A1 | 11/2011 | Ogino et al. |

FOREIGN PATENT DOCUMENTS

| | | |
|---|---|---|
| EP | 1592229 A2 | 11/2005 |
| EP | 1628468 A2 | 2/2006 |
| JP | H10-136264 A | 5/1998 |
| JP | 2001-045375 A | 2/2001 |
| JP | 2001-045378 A | 2/2001 |
| JP | 2005-244995 A | 9/2005 |
| JP | 2008-098971 A | 4/2008 |
| KR | 10-2007-0009278 A | 1/2007 |
| KR | 10-0697793 B1 | 3/2007 |
| KR | 10-2007-0091104 A | 9/2007 |

OTHER PUBLICATIONS

Office Action issued in Chinese Patent Application No. 200980142275.6, dated Jun. 19, 2013.

European Search Report issued in counterpart European Application No. 09821931.4, dated Aug. 7, 2014.

* cited by examiner

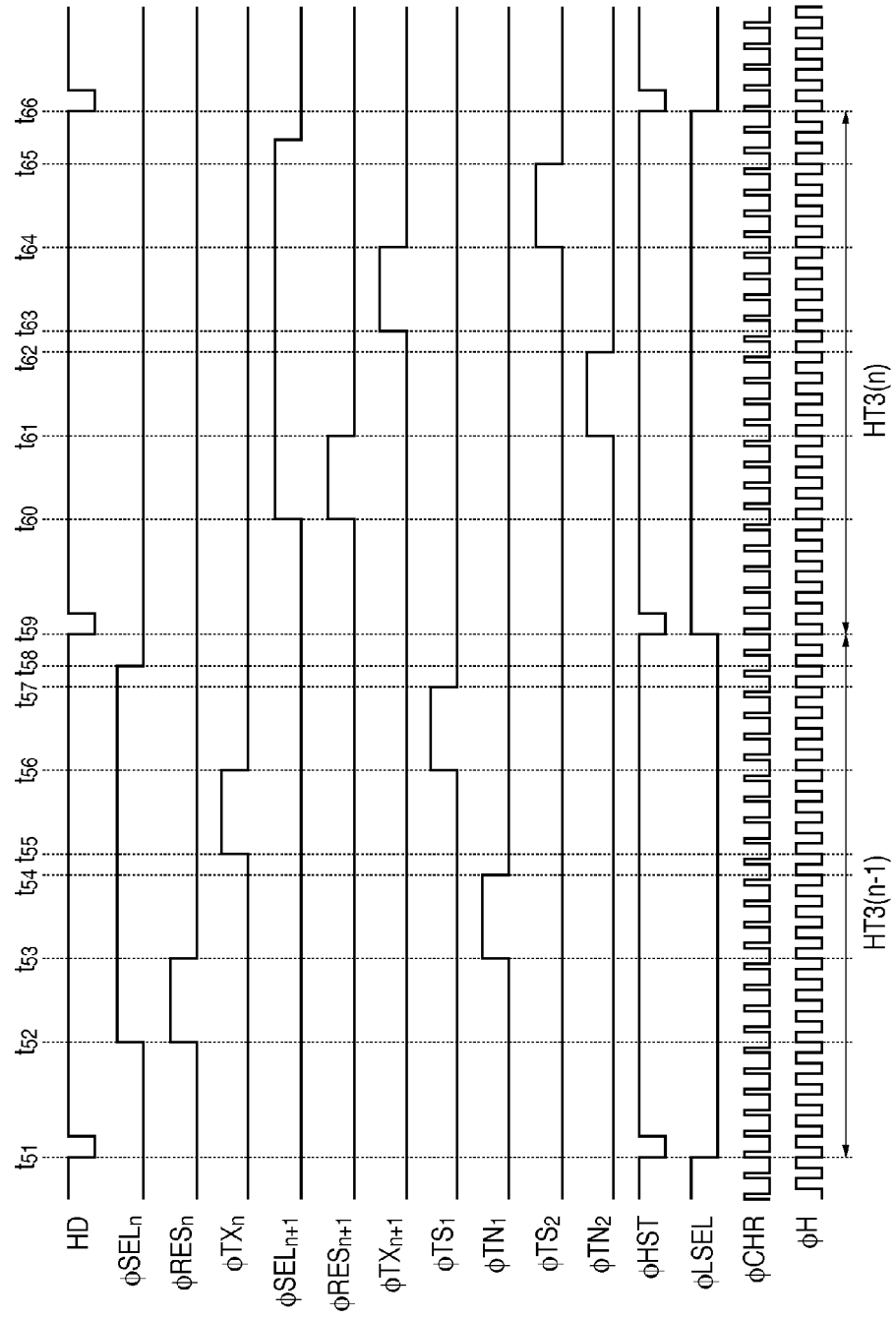

IMAGE SENSOR AND IMAGE SENSING APPARATUS WITH PLURAL VERTICAL OUTPUT LINES

This application is a continuation of application Ser. No. 13/057,307 filed Feb. 3, 2011, which was the National Stage of International Patent Application No. PCT/JP2009/067583 filed Oct. 2, 2009.

TECHNICAL FIELD

The present invention relates to an image sensor and image sensing apparatus.

BACKGROUND ART

Japanese Patent Laid-Open No. 2001-45375 discloses a solid-state image sensing apparatus in which two pairs of external accumulation capacitors are arranged on a vertical output line 8 connected to pixels on each column in a pixel array in which a plurality of pixels are arranged in directions along the row and column, as shown in FIG. 1 of Japanese Patent Laid-Open No. 2001-45375. In this solid-state image sensing apparatus, external accumulation capacitors CTN2, CTS2, CTN1, and CTS1 are connected to the vertical output line 8 via MOS transistors 9 to 12, and horizontal output lines via MOS transistors 18, 17, 16, and 15. The MOS transistors 18 and 17 and the MOS transistors 16 and 15 are turned on/off by two horizontal transfer control lines 24 and 25, respectively.

In a period TH1 shown in FIG. 2 of Japanese Patent Laid-Open No. 2001-45375, the horizontal transfer control lines 24 of respective columns are sequentially activated to sequentially turn on the MOS transistors 18 and 17 of the respective columns, as represented by a waveform HSRC. In response to this, the signals of pixels on the (n−1)th row that are accumulated in the external accumulation capacitors CTN2 and CTS2 of the respective columns are sequentially transferred to a differential amplifier 21 via the horizontal output line. During a period T1 in the period TH1, φRES1 changes to high level to reset the stray capacitance of the gate of an amplifier 6 in each pixel on the (n)th row. During a period T2 in the period TH1, φTN1 changes to high level to transfer the signal of a noise component from each pixel on the (n)th row to the external accumulation capacitor CTN1 via the vertical output line 8. The external accumulation capacitor CTN1 holds the transferred signal. During a period T3 in the period TH1, φTX1 changes to high level to transfer photocharges stored in a photoelectric conversion element 2 of each pixel on the (n)th row to the stray capacitance of the gate of the MOS transistor via a MOS transistor 3. During a period T4 in the period TH1, φTS1 changes to high level to transfer the signal of the 'photocharge component+noise component' from each pixel on the (n)th row to the external accumulation capacitor CTS1 via the vertical output line 8. The external accumulation capacitor CTS1 holds the transferred signal.

According to Japanese Patent Laid-Open No. 2001-45375, a signal can be read out from a pixel during the horizontal transferring period. Thus, one horizontal scanning period can be fully used for the horizontal transferring period.

Japanese Patent Laid-Open No. 2001-45378 discloses a solid-state image sensing apparatus in which a vertical shift register VSR scans a row selection line connected to pixels on each row in a pixel array in which a plurality of pixels 'a11' to 'b23' are arranged in directions along the row and column, as shown in FIG. 1 of Japanese Patent Laid-Open No. 2001-45378. In this solid-state image sensing apparatus, accumulation units 1 and 2 are respectively connected to the two ends of a vertical signal line connected to pixels on each column of the pixel array.

In a period ('transfer a') during which TXa changes to high level, the vertical shift register VSR transfers the signals of pixels 'a11' to 'a13' on an odd-numbered row of the pixel array to the accumulation unit 1, as shown in FIG. 2 of Japanese Patent Laid-Open No. 2001-45378. In a period ('transfer b') during which TXb changes to high level, the vertical shift register VSR transfers the signals of pixels 'b11' to 'b13' on an even-numbered row of the pixel array to the accumulation unit 2. Parallel to this operation ('transfer b') of the vertical shift register VSR, a horizontal shift register HSR1 sequentially outputs the signals of the pixels 'a11' to 'a13' as OUT1 from the accumulation unit 1. Upon the lapse of a predetermined period (completion of 'transfer b') after the horizontal shift register HSR1 starts this operation, a horizontal shift register HSR2 sequentially outputs the signals of the pixels 'b11' to 'b13' as OUT2 from the accumulation unit 2 parallel to the operation of the horizontal shift register HSR1.

According to Japanese Patent Laid-Open No. 2001-45378, signals of two rows can be independently transferred to the two accumulation units in a given horizontal scanning period. A long readout period after transfer can be ensured, suppressing the readout operation frequency low.

In Japanese Patent Laid-Open No. 2001-45375, the solid-state image sensing apparatus has one signal transferring path (for pixels of one row) extending from the pixel array to the differential amplifier 21. The image sensing apparatus has a limit on shortening the total readout period from the pixel array to the differential amplifier 21.

According to Japanese Patent Laid-Open No. 2001-45378, the horizontal transfer operation OUT1 to transfer signals from the accumulation unit 1 to a differential amplifier D1 cannot be done in a period ('transfer a') during which the signals of the pixels 'a11' to 'a13' on an odd-numbered row are transferred to the accumulation unit 1, as shown in FIG. 2 of Japanese Patent Laid-Open No. 2001-45378. Also, the horizontal transfer operation OUT2 to transfer signals from the accumulation unit 2 to the other differential amplifier cannot be performed in a period ('transfer b') during which the signals of the pixels 'b11' to 'b13' on an even-numbered row are transferred to the accumulation unit 2. This image sensing apparatus includes two accumulation units and two differential amplifiers arranged for pixels of two rows. However, signal transfer from one accumulation unit to one differential amplifier and signal transfer from the other accumulation unit to the other differential amplifier need to start with a delay equal to or longer than the period of 'transfer a' or 'transfer b'. This makes it difficult to shorten the total readout period from the pixel array to a plurality of differential amplifiers.

DISCLOSURE OF INVENTION

The present invention provides for shortening the total readout period from a pixel unit array to a plurality of output amplifiers.

According to the first aspect of the present invention, there is provided an image sensor comprising: a pixel unit array in which a plurality of pixel units are arranged in a direction along a row and a direction along a column, each pixel unit including at least one photoelectric conversion unit, a charge-voltage converter, at least one transfer unit which transfers charges generated in the at least one photoelectric conversion unit to the charge-voltage converter, an output unit which outputs a signal corresponding to a voltage of the charge-voltage converter, and at least one color filter corresponding to the at least one photoelectric conversion unit; a driving unit which drives the pixel unit array; a first holding block which holds signals transferred from the pixel unit array via a plurality of first vertical output lines; a second holding block which holds signals transferred from the pixel unit array via a plurality of second vertical output lines; a first output amplifier which outputs a signal transferred from the first holding block; and a second output amplifier which outputs a signal transferred from the second holding block, each column of the pixel unit array including a plurality of first pixel units, each of which includes the at least one color filter of a color that is the same between the first pixel units, and in which the output units output signals to the first vertical output line, and a plurality of second pixel units, each of which includes the at least one color filter of a color that is the same between the second pixel units, and in which the output units output signals to the second vertical output line, wherein the driving unit drives the pixel unit array to parallel-perform, on each column of the pixel unit array, an operation to transfer signals from the first pixel units to the first holding block via the first vertical output line, and an operation to transfer signals from the second pixel units to the second holding block via the second vertical output line.

According to the second aspect of the present invention, there is provided an image sensing apparatus comprising: an image sensor according to the first aspect of the present invention; an optical system which forms an image on an image sensing plane of the image sensor; and a signal processing unit which processes a signal output from the image sensor to generate image data.

According to the third aspect of the present invention, there is provided an image sensor comprising: an array including a column on which a plurality of first photoelectric conversion units for converting light of a first color into charges and a plurality of second photoelectric conversion units for converting light of a second color into charges are arranged alternately in a vertical direction; a first charge-voltage converter which converts charges generated by the plurality of first photoelectric conversion units into a voltage; a second charge-voltage converter which converts charges generated by the plurality of second photoelectric conversion units into a voltage; a first vertical output line which transfers a first signal corresponding to the voltage of the first charge-voltage converter in the vertical direction; and a second vertical output line which transfers a second signal corresponding to the voltage of the second charge-voltage converter in the vertical direction.

According to the fourth aspect of the present invention, there is provided an image sensing apparatus comprising: an image sensor according to the third aspect of the present invention; an optical system which forms an image on an image sensing plane of the image sensor; and a signal processing unit which processes a signal output from the image sensor to generate image data.

The present invention can shorten the total readout period from a pixel unit array to a plurality of output amplifiers.

Further features of the present invention will become apparent from the following description of exemplary embodiments with reference to the attached drawings.

BRIEF DESCRIPTION OF DRAWINGS

FIG. 12 is a timing chart showing the operation of the image sensor 200.

BEST MODE FOR CARRYING OUT THE INVENTION

Figure 11:
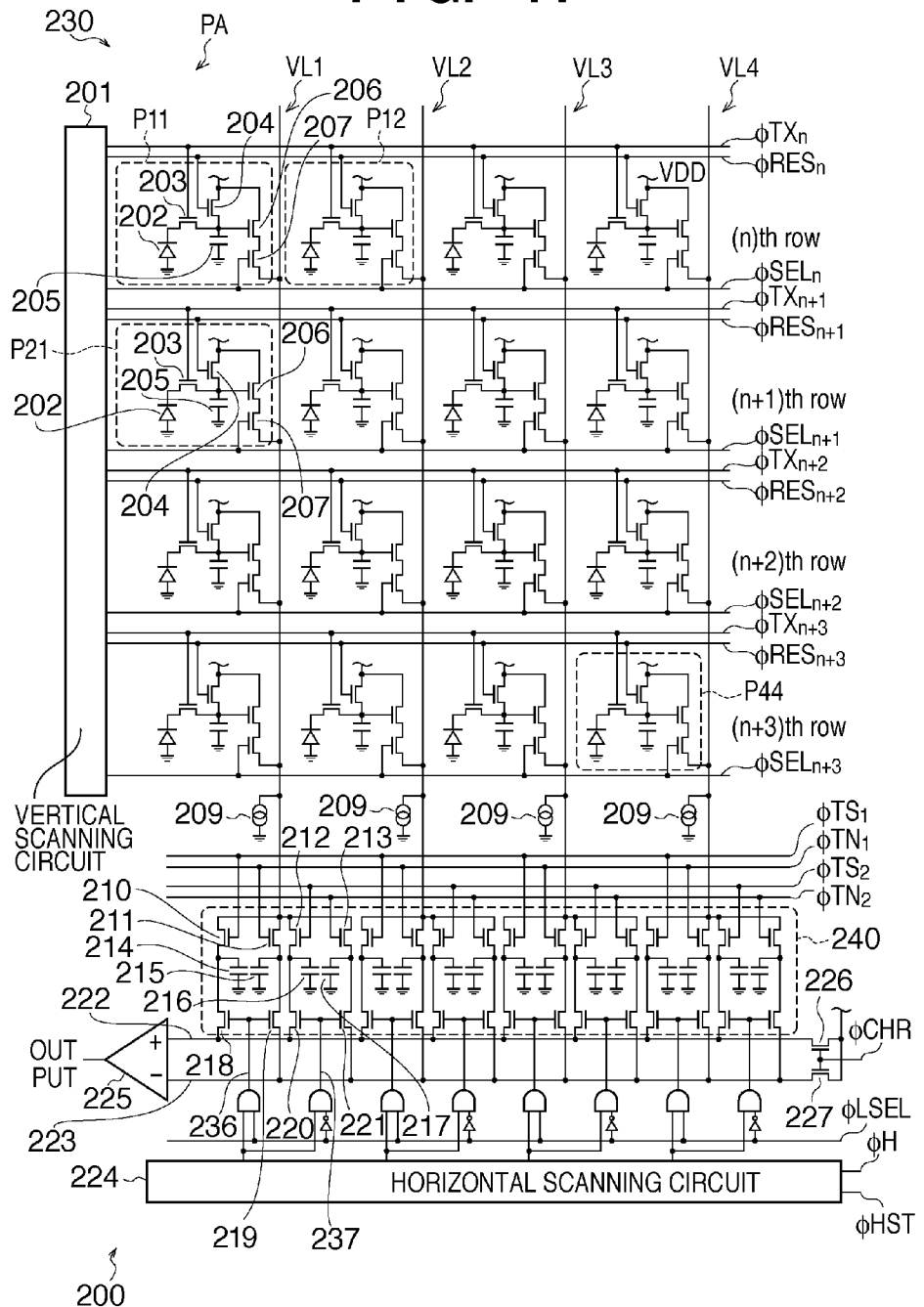
FIG. 11 is a circuit diagram showing the arrangement of an image sensor 200.

In an image sensor 200 shown in FIG. 11, the period to transfer signals from pixels on one row to a holding block may become longer than the horizontal transferring period. FIG. 11 is a circuit diagram showing the arrangement of the image sensor 200. The image sensor 200 will be described in detail.

The image sensor 200 includes a pixel array PA, driving unit 230, holding block 240, and output amplifier 225.

In the pixel array PA, a plurality of pixels P11 to P44 are arranged in a direction (horizontal direction) along the row and a direction (vertical direction) along the column. FIG. 11 illustrates the pixel array PA made up of 4×4 pixels.

The pixel P11 includes a photoelectric conversion unit 202, transfer unit 203, charge-voltage converter 205, reset unit 204, output unit 206, and selection unit 207.

The photoelectric conversion unit 202 generates and accumulates charges corresponding to incident light. The photoelectric conversion unit 202 includes, for example, a photodiode.

The transfer unit 203 transfers charges generated in the photoelectric conversion unit 202 to the charge-voltage converter 205. The transfer unit 203 includes, for example, a transfer transistor. Upon receiving an active-level transfer control signal $\phi TX_n$ at the gate from a vertical scanning circuit 201 (to be described later), the transfer unit 203 is turned on to transfer charges generated in the photoelectric conversion unit 202 to the charge-voltage converter 205.

The charge-voltage converter 205 converts the transferred charges into a voltage in accordance with its parasitic capacitance. The charge-voltage converter 205 includes, for example, a floating diffusion.

The reset unit 204 resets the charge-voltage converter 205. The reset unit 204 includes, for example, a reset transistor. Upon receiving an active-level reset control signal $\phi RES_n$ at the gate from the vertical scanning circuit 201, the reset unit 204 is turned on to reset the charge-voltage converter 205.

The output unit 206 outputs a signal corresponding to the voltage of the charge-voltage converter 205 to a vertical output line VL1. The output unit 206 includes, for example, an amplification transistor. The output unit 206 performs a source follower operation together with a load current source 209 connected to the vertical output line VL1, thereby outputting the signal corresponding to the voltage of the charge-voltage converter 205 to the vertical output line VL1. More specifically, in a state where the reset unit 204 has reset the charge-voltage converter 205, the output unit 206 outputs a noise signal corresponding to the voltage of the charge-voltage converter 205 to the vertical output line VL1. In a state where the transfer unit 203 has transferred the charges of the photoelectric conversion unit 202 to the charge-voltage converter 205, the output unit 206 outputs an optical signal corresponding to the voltage of the charge-voltage converter 205 to the vertical output line VL1.

The selection unit 207 selects/deselects the pixel P11. The selection unit 207 includes, for example, a selection transistor. Upon receiving an active-level selection control signal $\phi SEL_n$ at the gate from the vertical scanning circuit 201, the selection unit 207 is turned on to select the pixel P11. Upon receiving a nonactive-level selection control signal $\phi SEL_n$ at the gate from the vertical scanning circuit 201, the selection unit 207 is turned off to deselect the pixel P11.

The remaining pixels P12 to P44 have similar structure to that of the pixel P11.

The driving unit 230 drives the pixel array PA. The driving unit 230 includes the vertical scanning circuit 201. The vertical scanning circuit 201 vertically scans the pixel array PA to select a row (readout row) to read out signals from the pixel array PA, and output noise signals and optical signals from pixels on the readout row to a plurality of vertical output lines VL1 to VL4. The driving unit 230 outputs noise signals and optical signals from pixels on the readout row to the vertical output lines VL1 to VL4 at different timings.

The holding block 240 holds noise signals and optical signals transferred from the pixel array PA via the vertical output lines VL1 to VL4. More specifically, the holding block 240 receives noise signals and optical signals output from pixels on a readout row selected by the vertical scanning circuit 201 to the vertical output lines VL1 to VL4, and temporarily holds the received noise signals and optical signals. A horizontal scanning circuit 224 horizontally scans the holding block 240 to sequentially output the noise signals and optical signals of respective columns held in the holding block 240 to horizontal output lines 222 and 223.

The horizontal scanning circuit 224 shifts pulses corresponding to a start pulse $\phi HST$ in synchronism with a horizontal scanning pulse $\phi H$, sequentially activating horizontal scanning lines 236 or 237 of respective columns.

The holding block 240 includes transfer gates 210 to 213, holding capacitances 214 to 217, and readout switches 218 to 221.

The transfer gates 210 to 213 are turned on in accordance with control signals $\phi TS_1$ to $\phi TN_2$, transferring signals output to the vertical output lines VL1 to VL4 to the holding capacitances 214 to 217.

The holding capacitances 214 to 217 temporarily hold the transferred signals. The holding capacitances 214 and 215 hold the optical signal and noise signal of a single pixel. The holding capacitances 216 and 217 hold the optical signal and noise signal of a single pixel.

The horizontal scanning circuit 224 sequentially activates either the horizontal scanning lines 236 or 237 of respective columns in accordance with a control signal $\phi LSEL$. When sequentially activating the horizontal scanning lines 236 of respective columns, the readout switches 218 and 219 of the respective columns are sequentially turned on to sequentially output optical signals and noise signals held in the holding capacitances 214 and 215 of the respective columns to the horizontal output lines 222 and 223. When sequentially activating the horizontal scanning lines 237 of respective columns, the readout switches 220 and 221 of the respective columns are sequentially turned on to sequentially output optical signals and noise signals held in the holding capacitances 216 and 217 of the respective columns to the horizontal output lines 222 and 223.

The output amplifier 225 receives noise signals and optical signals respectively output to the horizontal output lines 222 and 223. The output amplifier 225 obtains the difference between the received noise signals and optical signals, generating and outputting an image signal.

Reset switches 226 and 227 are connected to the horizontal output lines 222 and 223, respectively. The reset switches 226 and 227 reset the horizontal output lines 222 and 223 at predetermined timings.

The operation of the image sensor 200 will be explained with reference to FIG. 12. FIG. 12 is a timing chart showing the operation of the image sensor 200.

At time $t_{51}$, $\phi LSEL$ changes to LOW, and the horizontal scanning circuit 224 starts sequentially activating the horizontal scanning lines 237 of respective columns. Also, $\phi HD$ and $\phi HST$ change to an active level (LOW). $\phi HD$ is a horizontal sync signal. In response to this, the horizontal scanning circuit 224 starts a horizontal transfer operation to sequentially turn on the readout switches 220 and 221 of the respective columns in synchronism with $\phi H$. Then, the optical signals and noise signals of pixels on the (n−1)th row that are held in the holding capacitances 216 and 217 of the respective columns are sequentially transferred to the output amplifier 225 via the horizontal output lines 222 and 223. The horizontal transfer operation for the signals of the pixels on the (n−1)th row continues during a period of times $t_{51}$ to $t_{59}$. In other words, the period of times $t_{51}$ to $t_{59}$ serves as a horizontal transferring period $HT3(n-1)$ for the signals of the pixels on the (n−1)th row.

Similarly, a horizontal transfer operation for the signals of pixels on the (n)th row is performed during a period of times $t_{59}$ to $t_{66}$. That is, the period of times $t_{59}$ to $t_{66}$ serves as a horizontal transferring period $HT3(n)$ for the signals of the pixels on the (n)th row.

At time $t_{52}$ in the horizontal transferring period $HT3(n-1)$, the vertical scanning circuit 201 supplies an active-level selection control signal $\phi SEL_n$ to the pixels on the (n)th row to select them. The vertical scanning circuit 201 supplies an active-level reset control signal $\phi RES_n$ to the pixels on the (n)th row. In the pixels on the (n)th row, the reset units 204 reset the charge-voltage converters 205. The output units 206 output noise signals corresponding to the voltages of the charge-voltage converters 205 to the vertical output lines VL1 to VL4.

At time $t_{53}$ in the horizontal transferring period HT3($n$−1), $\phi TN_2$ changes to an active level to turn on the transfer gates 211 of the respective columns. Then, the noise signals of the pixels on the (n)th row that have been output to the vertical output lines VL1 to VL4 are transferred to the holding capacitances 215 of the respective columns.

At time $t_{54}$ in the horizontal transferring period HT3($n$−1), $\phi TN_2$ changes to a nonactive level to turn off the transfer gates 211 of the respective columns. The holding capacitances 215 of the respective columns hold the transferred noise signals of the pixels on the (n)th row.

At time $t_{55}$ in the horizontal transferring period HT3($n$−1), the vertical scanning circuit 201 supplies an active-level transfer control signal $\phi TX_n$ to the pixels on the (n)th row. In the pixels on the (n)th row, the transfer units 203 transfer the charges of the photoelectric conversion units 202 to the charge-voltage converters 205. The output units 206 output optical signals corresponding to the voltages of the charge-voltage converters 205 to the vertical output lines VL1 to VL4.

At time $t_{56}$ in the horizontal transferring period HT3($n$−1), the vertical scanning circuit 201 changes the transfer control signal $\phi TX_n$ to a nonactive level. Further, $\phi TS_1$ changes to an active level to turn on the transfer gates 210 of the respective columns. The optical signals of the pixels on the (n)th row that have been output to the vertical output lines VL1 to VL4 are transferred to the holding capacitances 214 of the respective columns.

At time $t_{57}$ in the horizontal transferring period HT3($n$−1), $\phi TS_1$ changes to a nonactive level to turn off the transfer gates 210 of the respective columns. The holding capacitances 214 of the respective columns then hold the transferred optical signals of the pixels on the (n)th row.

At time $t_{58}$ in the horizontal transferring period HT3($n$−1), the vertical scanning circuit 201 supplies a nonactive-level selection control signal $\phi SEL_n$ to the pixels on the (n)th row to deselect them.

In this manner, the image sensor 200 parallel-executes a horizontal transfer operation to transfer the signals of the pixels on the (n−1)th row from the holding block 240 to the output amplifier 225 and an operation to transfer the signals of the pixels on the (n)th row from the pixels to the holding block 240.

If the time necessary to transfer signals from pixels on one row to the holding block is shorter than that necessary for the horizontal transfer operation, the horizontal transfer operations of respective rows can be successively executed without generating a horizontal blanking period between these operations. In this case, the total readout period from the pixel array to the output amplifier can be shortened to increase the readout speed from the pixel array to the output amplifier.

However, if the time necessary to transfer signals from pixels on one row to the holding block is longer than that necessary for the horizontal transfer operation, the horizontal transfer operation of signals transferred to the holding block must wait until the signals of pixels on the next row can be read out. That is, the horizontal scanning period requires a horizontal blanking period during which no horizontal transfer operation is done. If the horizontal blanking period is required every time the signals of pixels on one row are read out, the total readout period from the pixel array to the output amplifier is determined depending on the period to transfer signals from the pixel array to the holding block. In this case, it becomes difficult to shorten the total readout period from the pixel array to the output amplifier. The readout speed from the pixel array to the output amplifier cannot be increased.

During the period to transfer signals from the pixel array to the holding block, the stray capacitance of the vertical output line need to be charged and discharged in addition to the holding capacitance. Further, the load current of the output unit (amplification transistor) cannot be increased in terms of power saving of the image sensor and suppressing the temperature rise. Therefore, a predetermined time or longer must be ensured to charge and discharge the vertical output line, in addition to the time to charge and discharge the holding capacitance. This makes it difficult to increase the readout speed. Especially a large-size image sensor used in a digital single-lens reflex camera suffers a large stray capacitance of the vertical output line and has a limit on increasing the readout speed.

Figure 1:
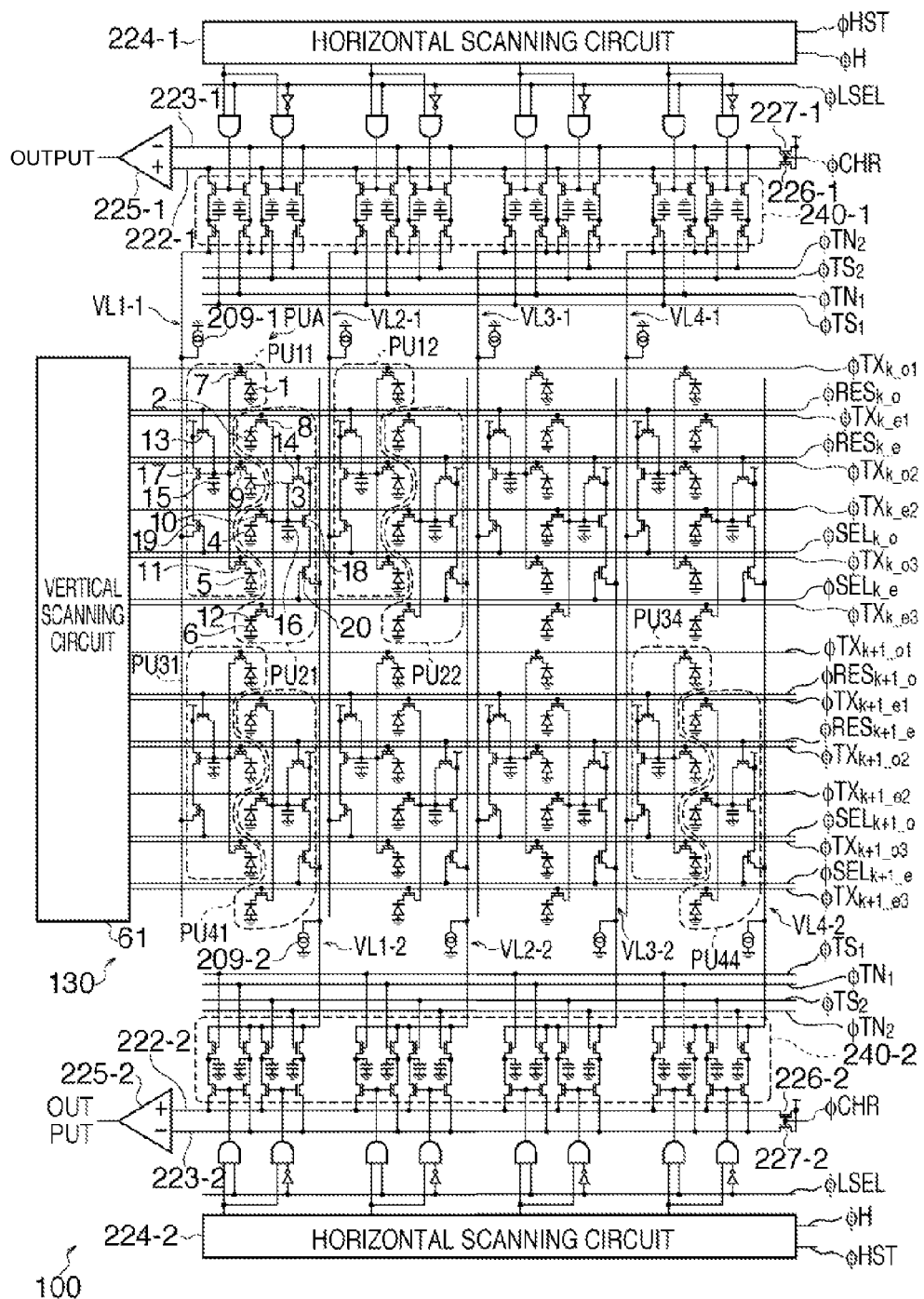
FIG. 1 is a circuit diagram showing the arrangement of an image sensor 100 according to the first embodiment of the present invention.

An image sensor 100 according to the first embodiment of the present invention will be described with reference to FIG. 1. FIG. 1 is a circuit diagram showing the arrangement of the image sensor 100 according to the first embodiment of the present invention. A difference from the image sensor 200 shown in FIG. 11 will be mainly explained.

The image sensor 100 includes a pixel unit array PUA, driving unit 130, first holding block 240-1, second holding block 240-2, first output amplifier 225-1, and second output amplifier 225-2.

In the pixel unit array PUA, a plurality of pixel units PU11 to PU44 are arranged in directions along the row and column. FIG. 1 illustrates the pixel unit array PUA made up of 4×4 pixel units.

In each of the pixel units PU11 to PU44, three pixels (photoelectric conversion units) arranged every other pixel in the direction along the column in FIG. 1 share a charge-voltage converter, reset unit, output unit, and selection unit.

Each column of the pixel unit array PUA includes a plurality of first pixel units and a plurality of second pixel units. For example, the first column (left column in FIG. 1) of the pixel unit array PUA includes the first pixel units PU11 and PU31 and the second pixel units PU21 and PU41. The pixel units of each column in the pixel unit array PUA is adjacent to the first vertical output line on the first side (on the left) and the second vertical output line on the second side (on the right).

Figure 4A:
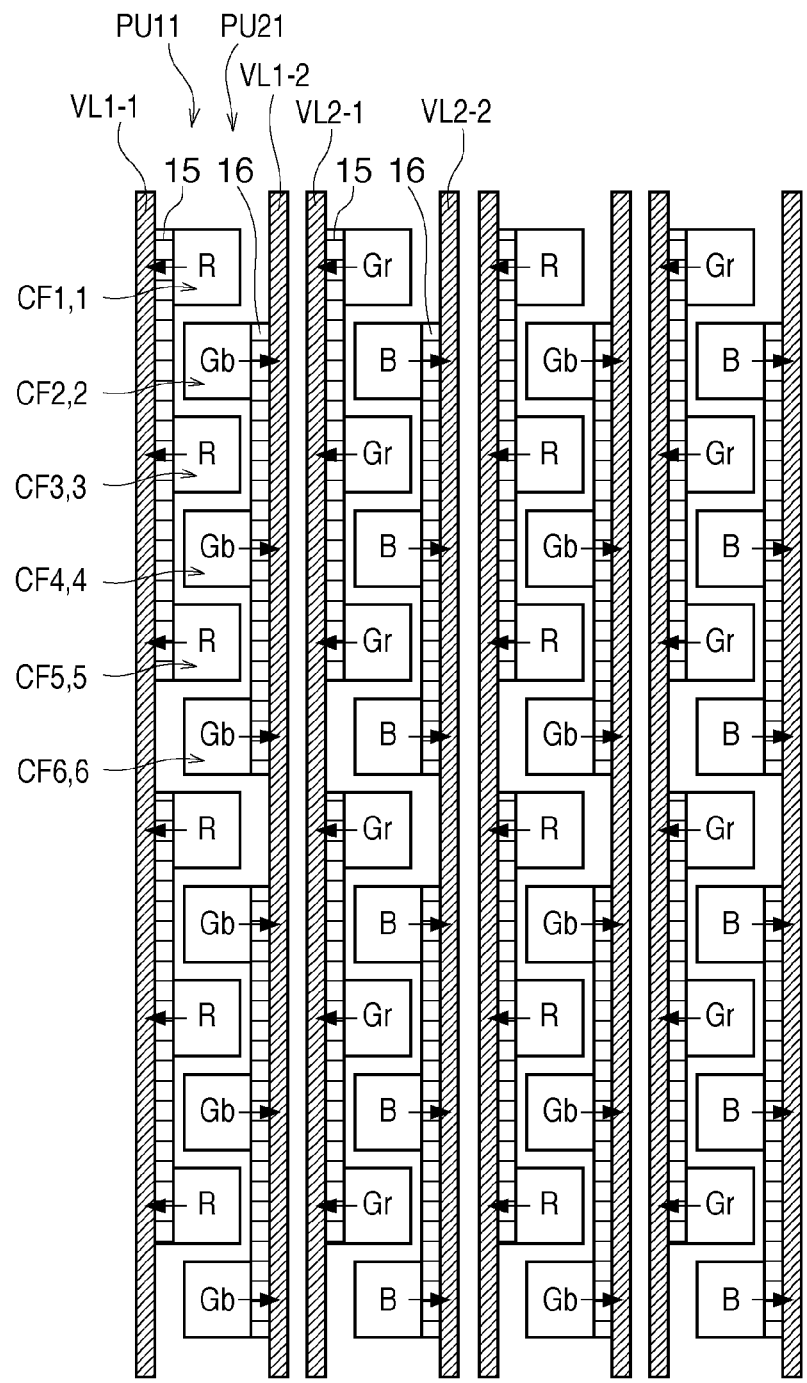
FIGS. 4A and 4B are views each showing the layout of the image sensor 100 according to the first embodiment of the present invention.
Figure 4B:
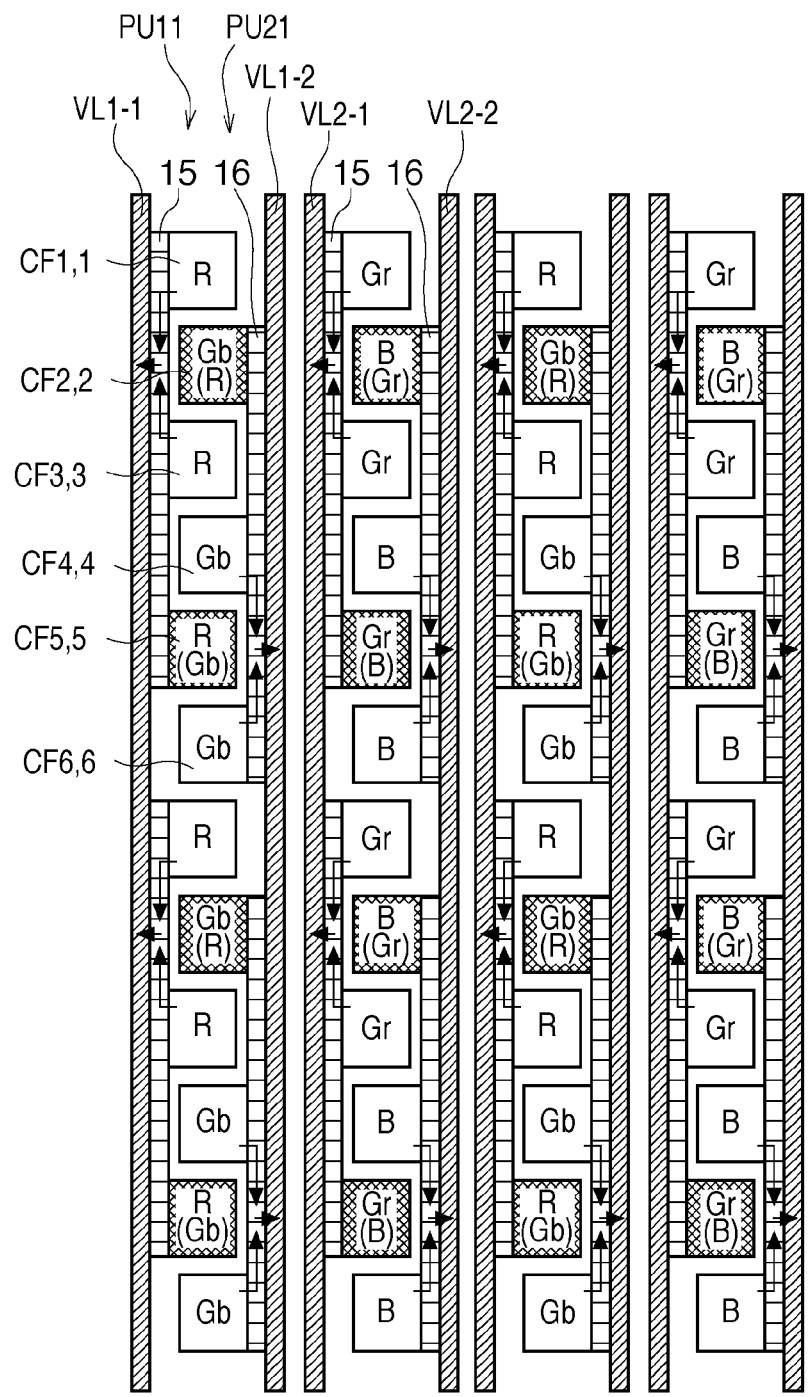

The first pixel unit PU11 includes three photoelectric conversion units 1, 3, and 5, three transfer units 7, 9, and 11, a charge-voltage converter 15, a reset unit 13, an output unit 17, a selection unit 19, and three color filters CF1, CF3, and CF5 (see FIGS. 4A and 4B).

When turned on, the transfer unit (transfer transistor) 7 electrically connects the photoelectric conversion unit 1 and charge-voltage converter 15, and when turned off, electrically disconnects them. When turned on, the transfer unit (transfer transistor) 9 electrically connects the photoelectric conversion unit 3 and charge-voltage converter 15, and when turned off, electrically disconnects them. When turned on, the transfer unit (transfer transistor) 11 electrically connects the photoelectric conversion unit 5 and charge-voltage converter 15, and when turned off, electrically disconnects them.

One of the three transfer units 7, 9, and 11 can be turned on to transfer the charges of one photoelectric conversion unit to the charge-voltage converter. Two of the three transfer units 7, 9, and 11 can be turned on to transfer the charges of two photoelectric conversion units to the charge-voltage converter. In this case, the charge-voltage converter adds the charges generated in the two photoelectric conversion units. All the three transfer units 7, 9, and 11 can be turned on to transfer the charges of three photoelectric conversion units to the charge-voltage converter. In this case, the charge-voltage converter adds the charges generated in the three photoelectric conversion units.

When the charges of one photoelectric conversion unit are transferred, the charge-voltage converter 15 converts the transferred charges into a voltage. When the charges of two photoelectric conversion units are transferred, the charges transferred from the two photoelectric conversion units are added by the two transfer units in the charge-voltage converter 15, and the charge-voltage converter 15 converts the added charges into a voltage. When the charges of three photoelectric conversion units are transferred, the charges transferred from the three photoelectric conversion units are added by the three transfer units in the charge-voltage converter 15, and the charge-voltage converter 15 converts the added charges into a voltage.

The output unit 17 outputs a signal corresponding to the voltage of the charge-voltage converter 15 to a first vertical output line VL1-1.

The selection unit 19 selects/deselects the pixel unit PU11.

The three color filters CF1, CF3, and CF5 correspond to the three photoelectric conversion units 1, 3, and 5. The three color filters CF1, CF3, and CF5 transmit lights of the same color (R) so that lights of the same color (R) are guided to the three photoelectric conversion units 1, 3, and 5.

The first pixel unit PU31 has similar arrangement to that of the first pixel unit PU11. More specifically, each of the first pixel units PU11 and PU31 includes three color filters (see FIG. 4A) of a color (R) which is the same between the pixel units. The output units of the first pixel units PU11 and PU31 output signals to the first vertical output line VL1-1.

The second pixel unit PU21 includes three photoelectric conversion units 2, 4, and 6, three transfer units 8, 10, and 12, a charge-voltage converter 16, a reset unit 14, an output unit 18, a selection unit 20, and three color filters CF2, CF4, and CF6 (see FIG. 4A).

When turned on, the transfer unit (transfer transistor) 8 electrically connects the photoelectric conversion unit 2 and charge-voltage converter 16, and when turned off, electrically disconnects them. When turned on, the transfer unit (transfer transistor) 10 electrically connects the photoelectric conversion unit 4 and charge-voltage converter 16, and when turned off, electrically disconnects them. When turned on, the transfer unit (transfer transistor) 12 electrically connects the photoelectric conversion unit 6 and charge-voltage converter 16, and when turned off, electrically disconnects them.

One of the three transfer units 8, 10, and 12 can be turned on to transfer the charges of one photoelectric conversion unit to the charge-voltage converter. Two of the three transfer units 8, 10, and 12 can be turned on to transfer the charges of two photoelectric conversion units to the charge-voltage converter. In this case, the charge-voltage converter adds the charges (signals) generated in the two photoelectric conversion units. All the three transfer units 8, 10, and 12 can be turned on to transfer the charges of three photoelectric conversion units to the charge-voltage converter. In this case, the charge-voltage converter adds the charges (signals) generated in the three photoelectric conversion units.

When the charges of one photoelectric conversion unit are transferred, the charge-voltage converter 16 converts the transferred charges into a voltage. When the charges of two photoelectric conversion units are transferred, the charges transferred from the two photoelectric conversion units added by the two transfer units in the charge-voltage converter 16, and the charge-voltage converter 16 converts the added charges into a voltage. When the charges of three photoelectric conversion units are transferred, the charges transferred from the three photoelectric conversion units are added by the three transfer units in the charge-voltage converter 16, and the charge-voltage converter 16 converts the added charges into a voltage.

The output unit 18 outputs a signal corresponding to the voltage of the charge-voltage converter 16 to a second vertical output line VL1-2.

The selection unit 20 selects/deselects the pixel unit PU21.

The three color filters CF2, CF4, and CF6 correspond to the three photoelectric conversion units 2, 4, and 6. The three color filters CF2, CF4, and CF6 transmit lights of the same color (Gb) so that lights of the same color (Gb) are guided to the three photoelectric conversion units 2, 4, and 6.

The second pixel unit PU41 has the same arrangement as that of the second pixel unit PU21. More specifically, each of the second pixel units PU21 and PU41 includes three color filters (see FIG. 4A) of a color (Gb) which is the same between the pixel units. The output units of the second pixel units PU21 and PU41 output signals to the second vertical output line VL1-2.

The array of color filters in the pixel unit array PUA forms a Bayer array (see FIG. 4A). More specifically, color filters of the same color are arranged every other color filter on each column in the array of color filters in the pixel unit array PUA. In correspondence with this, the photoelectric conversion units of the first pixel units and those of the second pixel units are arranged alternately on each column in the direction along the column in the array of photoelectric conversion units in the pixel unit array PUA.

The driving unit 130 drives the pixel unit array PUA to parallel-perform the first and second operations on each column of the pixel unit array PUA. In the first operation, a noise signal and optical signal are transferred from the first pixel unit to the first holding block via the first vertical output line. In the second operation, a noise signal and optical signal are transferred from the second pixel unit to the second holding block via the second vertical output line. More specifically, the driving unit 130 selects the first row from a plurality of rows on which the first pixel units are arranged in the pixel unit array PUA. Parallel to this, the driving unit 130 selects the second row from a plurality of rows on which the second pixel units are arranged in the pixel unit array PUA. The driving unit 130 outputs signals from the first pixel units on the selected first row to first vertical output lines VL1-1 to VL4-1. Also, the driving unit 130 outputs signals from the second pixel units on the selected second row to second vertical output lines VL1-2 to VL4-2.

The first holding block 240-1 holds noise signals and optical signals transferred from the pixel unit array PUA via the first vertical output lines VL1-1 to VL4-1. More specifically, the first holding block 240-1 receives noise signals and optical signals output from the first pixel units on the first row selected by a vertical scanning circuit 61 to the first vertical output lines VL1-1 to VL4-1, and temporarily holds the received noise signals and optical signals. As a horizontal scanning circuit 224-1 scans the first holding block 240-1 horizontally, the noise signals and optical signals of the respective columns held in the first holding block 240-1 are sequentially output to horizontal output lines 222-1 and 223-1.

The second holding block 240-2 holds noise signals and optical signals transferred from the pixel unit array PUA via the second vertical output lines VL1-2 to VL4-2. More specifically, the second holding block 240-2 receives noise signals and optical signals output from the second pixel units on the second row selected by the vertical scanning circuit 61 to the second vertical output lines VL1-2 to VL4-2, and temporarily holds the received noise signals and optical signals. As a horizontal scanning circuit 224-2 scans the second holding block 240-2 horizontally, the noise signals and optical signals of the respective columns held in the second holding block 240-2 are sequentially output to horizontal output lines 222-2 and 223-2.

The first holding block 240-1 and second holding block 240-2 have similar arrangement to that of the holding block 240 shown in FIG. 11.

The first output amplifier 225-1 outputs signals transferred from the first holding block 240-1. More specifically, the first output amplifier 225-1 receives noise signals and optical signals output to the horizontal output lines 222-1 and 223-1. The first output amplifier 225-1 obtains the difference between the received noise signals and optical signals, generating and outputting an image signal.

The second output amplifier 225-2 outputs signals transferred from the second holding block 240-2. The second output amplifier 225-2 receives noise signals and optical signals output to the horizontal output lines 222-2 and 223-2. The second output amplifier 225-2 obtains the difference between the received noise signals and optical signals, generating and outputting an image signal.

In this fashion, two systems of vertical signal lines (for pixels of two rows) are arranged between the pixel unit array PUA and a plurality of holding blocks. The driving unit parallel-executes transfer of signals from the pixel unit array to the first holding block and transfer of signals from the pixel unit array to the second holding block. This allows simultaneously starting a subsequent horizontal transfer operation from the first holding block to the first output amplifier and a subsequent horizontal transfer operation from the second holding block to the second output amplifier. As a result, the image sensor can reduce the total readout period from the pixel unit array to a plurality of output amplifiers.

The length of the period to transfer signals from the pixel array to the holding block can be substantially halved, compared to sequentially performing signal transfer from the pixel unit array to the first holding block and signal transfer from the pixel unit array to the second holding block.

Each of the pixel units includes 2N+1 photoelectric conversion units arranged in the direction along the column, 2N+1 transfer units, and 2N+1 color filters arranged in the direction along the column. N is a positive integer, and N=1 in the first embodiment. In this case, the signals of 2M+1 (M is a positive integer equal to or smaller than N) photoelectric conversion units can be parallel-transferred to the charge-voltage converter, added, and read out. The period to transfer signals from the pixel unit array to the holding block in the first embodiment becomes shorter than the period to transfer signals from the pixel array to the holding block in the image sensor of FIG. 11. Also, the first embodiment can suppress degradation of the quality of an image obtained from signals read out from the pixel unit array.

More specifically, the driving unit 130 can drive the pixel unit array PUA to parallel-perform the first and second adding operations. In the first adding operation, 2M transfer units in the first pixel unit transfer the charges of 2M photoelectric conversion units to the charge-voltage converter to add them. The charge-voltage converter converts the added charges into a voltage. The output unit outputs a signal corresponding to the voltage of the charge-voltage converter to the first vertical output line. In the second adding operation, 2M transfer units in the second pixel unit transfer the charges of 2M photoelectric conversion units to the charge-voltage converter to add them. The charge-voltage converter converts the added charges into a voltage. The output unit outputs a signal corresponding to the voltage of the charge-voltage converter to the second vertical output line.

The operation of the image sensor according to the first embodiment of the present invention will be explained with reference to FIGS. 2 and 3.

Figure 2:
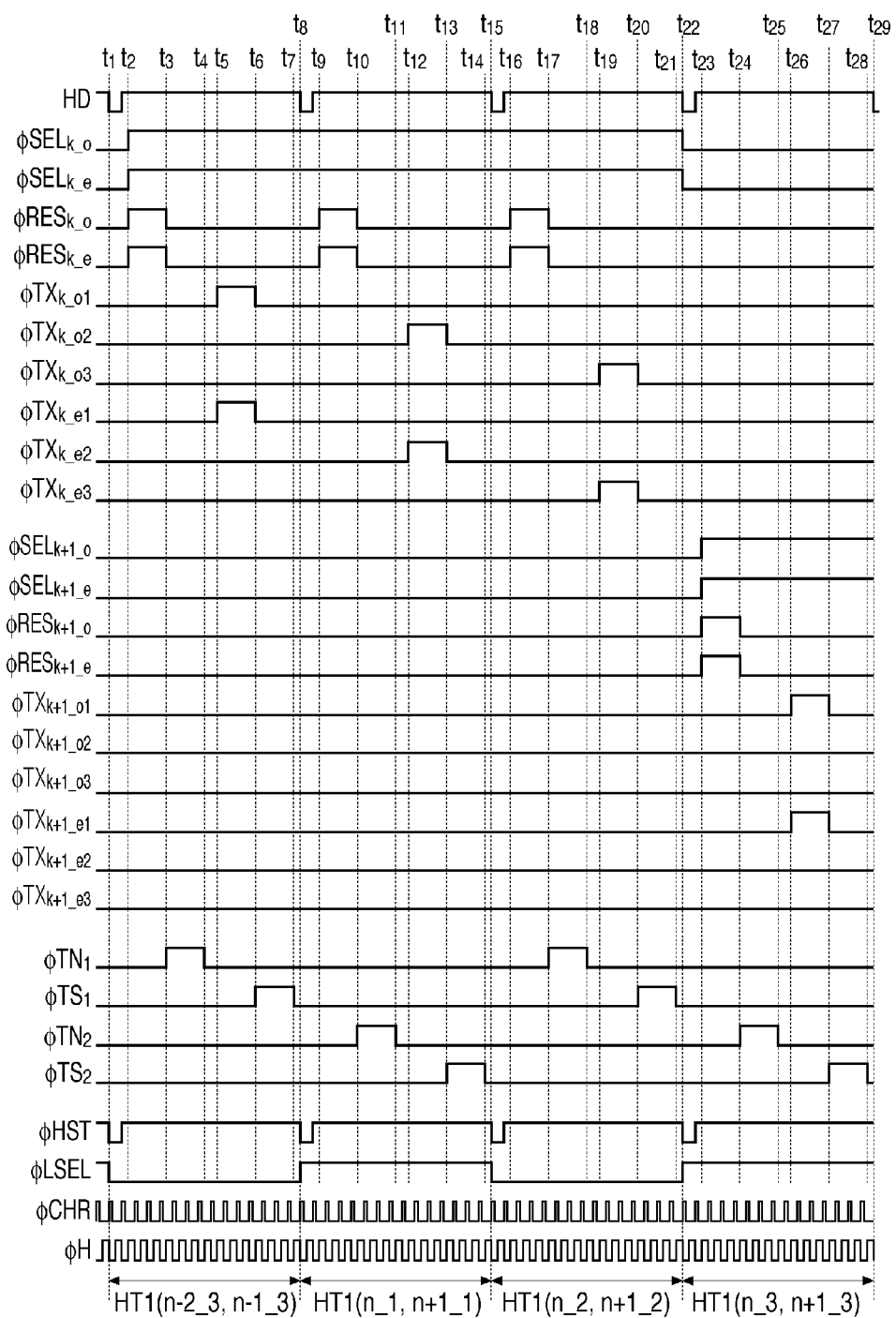
FIG. 2 is a timing chart showing driving timings (full pixel readout mode) when reading out signals from three photoelectric conversion units in each pixel unit of the image sensor without adding the signals according to the first embodiment of the present invention.

FIG. 2 shows driving timings (full pixel readout mode) when reading out signals from three photoelectric conversion units in each pixel unit of the image sensor without adding the signals according to the first embodiment of the present invention. Three photoelectric conversion units arranged in the direction along the column in each pixel unit will be called the first photoelectric conversion unit, second photoelectric conversion unit, and third photoelectric conversion unit sequentially from the top. Three transfer units arranged in the direction along the column in each pixel unit will be called the first transfer unit, second transfer unit, and third transfer unit sequentially from the top.

In a period of times $t_1$ to $t_8$, the horizontal scanning circuit 224-1 transfers, to the first output amplifier 225-1, the signals of the third photoelectric conversion units in pixel units on the (n−2)th row that are held in the first holding block 240-1. Parallel to this, the horizontal scanning circuit 224-2 transfers, to the second output amplifier 225-2, the signals of the third photoelectric conversion units in pixel units on the (n−1)th row that are held in the second holding block 240-2. The horizontal transfer operation for the signals of the third photoelectric conversion units on the (n−2)th and (n−1)th rows continues during the period of times $t_1$ to $t_8$. That is, the period of times $t_1$ to $t_8$ serves as a horizontal transferring period HT1 (n−2_3, n−1_3) for the signals of the third photoelectric conversion units on the (n−2)th and (n−1)th rows.

Similarly, a horizontal transfer operation for the signals of the first photoelectric conversion units on the (n)th and (n+1)th rows is performed during a period of times $t_8$ to $t_{15}$. That is, the period of times $t_8$ to $t_{15}$ serves as a horizontal transferring period HT1 (n_1, n+1_1) for the signals of the first photoelectric conversion units on the (n)th and (n+1)th rows.

A horizontal transfer operation for the signals of the second photoelectric conversion units on the (n)th and (n+1)th rows is done during a period of times $t_{15}$ to $t_{22}$. That is, the period of times $t_{15}$ to $t_{22}$ serves as a horizontal transferring period HT1 (n_2, n+1_2) for the signals of the second photoelectric conversion units on the (n)th and (n+1)th rows.

A horizontal transfer operation for the signals of the third photoelectric conversion units on the (n)th and (n+1)th rows is done during a period of times $t_{22}$ to $t_{29}$. That is, the period of times $t_{22}$ to $t_{29}$ serves as a horizontal transferring period HT1 (n_3, n+1_3) for the signals of the third photoelectric conversion units on the (n)th and (n+1)th rows.

At times $t_2$ in the horizontal transferring period HT1 (n−2_3, n−1_3), the vertical scanning circuit 61 supplies active-level selection control signals $\phi SEL_{k\_o}$ and $\phi SEL_{k\_e}$ to pixel units on the (n)th and (n+1)th rows to select them.

The vertical scanning circuit 61 supplies active-level reset control signals $\phi RES_{k\_o}$ and $\phi RES_{k\_e}$ to the pixel units on the (n)th and (n+1)th rows. In the pixel units on the (n)th row, the reset units reset the charge-voltage converters, and the output units output noise signals corresponding to the voltages of the charge-voltage converters to the first vertical output lines VL1-1 to VL4-1. Parallel to this, in the pixel units on the (n+1)th row, the reset units reset the charge-voltage converters, and the output units output noise signals corresponding to the voltages of the charge-voltage converters to the second vertical output lines VL1-2 to VL4-2.

At time $t_3$ in the horizontal transferring period HT1 (n−2_3, n−1_3), $\phi TN_1$ changes to an active level to turn on transfer gates 211 (see FIG. 11) of respective columns in the first holding block 240-1 and second holding block 240-2. Accordingly, the noise signals of the pixel units on the (n)th row that have been output to the first vertical output lines VL1-1 to VL4-1 are transferred to holding capacitances 215 (see FIG. 11) of the respective columns in the first holding block 240-1. Parallel to this, the noise signals of the pixel units on the (n+1)th row that have been output to the second vertical output lines VL1-2 to VL4-2 are transferred to the holding capacitances 215 of the respective columns in the second holding block 240-2.

At time $t_4$ in the horizontal transferring period HT1 (n−2_3, n−1_3), $\phi TN_1$ changes to a nonactive level to turn off the transfer gates 211 of the respective columns in the first holding block 240-1 and second holding block 240-2. In response to this, the holding capacitances 215 of the respective columns in the first holding block 240-1 hold the transferred noise signals of the pixel units on the (n)th row. The holding capacitances 215 of the respective columns in the second holding block 240-2 hold the transferred noise signals of the pixel units on the (n+1)th row.

At time $t_5$ in the horizontal transferring period HT1 (n−2_3, n−1_3), the vertical scanning circuit 61 supplies active-level transfer control signals $\phi TX_{k\_o1}$ and $\phi TX_{k\_e1}$ to the first transfer units of the pixel units on the (n)th and (n+1)th rows. In the pixel units on the (n)th row, the first transfer units transfer the charges of the first photoelectric conversion units to the charge-voltage converters. The output units output optical signals corresponding to the voltages of the charge-voltage converters to the first vertical output lines VL1-1 to VL4-1. Parallel to this, in the pixel units on the (n+1)th row, the first transfer units transfer the charges of the first photoelectric conversion units to the charge-voltage converters. The output units output optical signals corresponding to the voltages of the charge-voltage converters to the second vertical output lines VL1-2 to VL4-2.

At time $t_6$ in the horizontal transferring period HT1 (n−2_3, n−1_3), the vertical scanning circuit 61 changes the transfer control signals $\phi TX_{k\_o1}$ and $\phi TX_{k\_e1}$ to a nonactive level. Also, $\phi TS_1$ changes to an active level to turn on transfer gates 210 (see FIG. 11) of the respective columns in the first holding block 240-1 and second holding block 240-2. Then, the optical signals of the first photoelectric conversion units in the pixel units on the (n)th row that have been output to the first vertical output lines VL1-1 to VL4-1 are transferred to holding capacitances 214 (see FIG. 11) of the respective columns in the first holding block 240-1. Parallel to this, the optical signals of the first photoelectric conversion units in the pixel units on the (n+1)th row that have been output to the second vertical output lines VL1-2 to VL4-2 are transferred to the holding capacitances 214 of the respective columns in the second holding block 240-2.

At time $t_7$ in the horizontal transferring period HT1 (n−2_3, n−1_3), $\phi TS_2$ changes to a nonactive level to turn off the transfer gates 210 of the respective columns in the first holding block 240-1 and second holding block 240-2. The holding capacitances 214 of the respective columns in the first holding block 240-1 hold the transferred optical signals of the first photoelectric conversion units in the pixel units on the (n)th row. The holding capacitances 214 of the respective columns in the second holding block 240-2 hold the transferred optical signals of the first photoelectric conversion units in the pixel units on the (n+1)th row.

At time $t_{22}$ in the horizontal transferring period HT1 (n_3, n+1_3), the vertical scanning circuit 61 supplies nonactive-level selection control signals $\phi SEL_{k\_o}$ and $\phi SEL_{k\_e}$ to the pixel units on the (n)th and (n+1)th rows to deselect them.

At time $t_{23}$ in the horizontal transferring period HT1 (n_3, n+1_3), the vertical scanning circuit 61 supplies active-level selection control signals $\phi SEL_{k+1\_o}$ and $\phi SEL_{k+1\_e}$ to the pixel units on the (n+2)th and (n+3)th rows to select them.

This operation can be executed in turn to individually read out the signals of all photoelectric conversion units without adding them. Even in this case, pixel units on two rows parallel-transfer signals to the two holding blocks 240-1 and 240-2. Compared to the image sensor shown in FIG. 11, the image sensor in the first embodiment can substantially halve the length of the period to transfer signals from the pixel unit array to the holding block.

Figure 3:
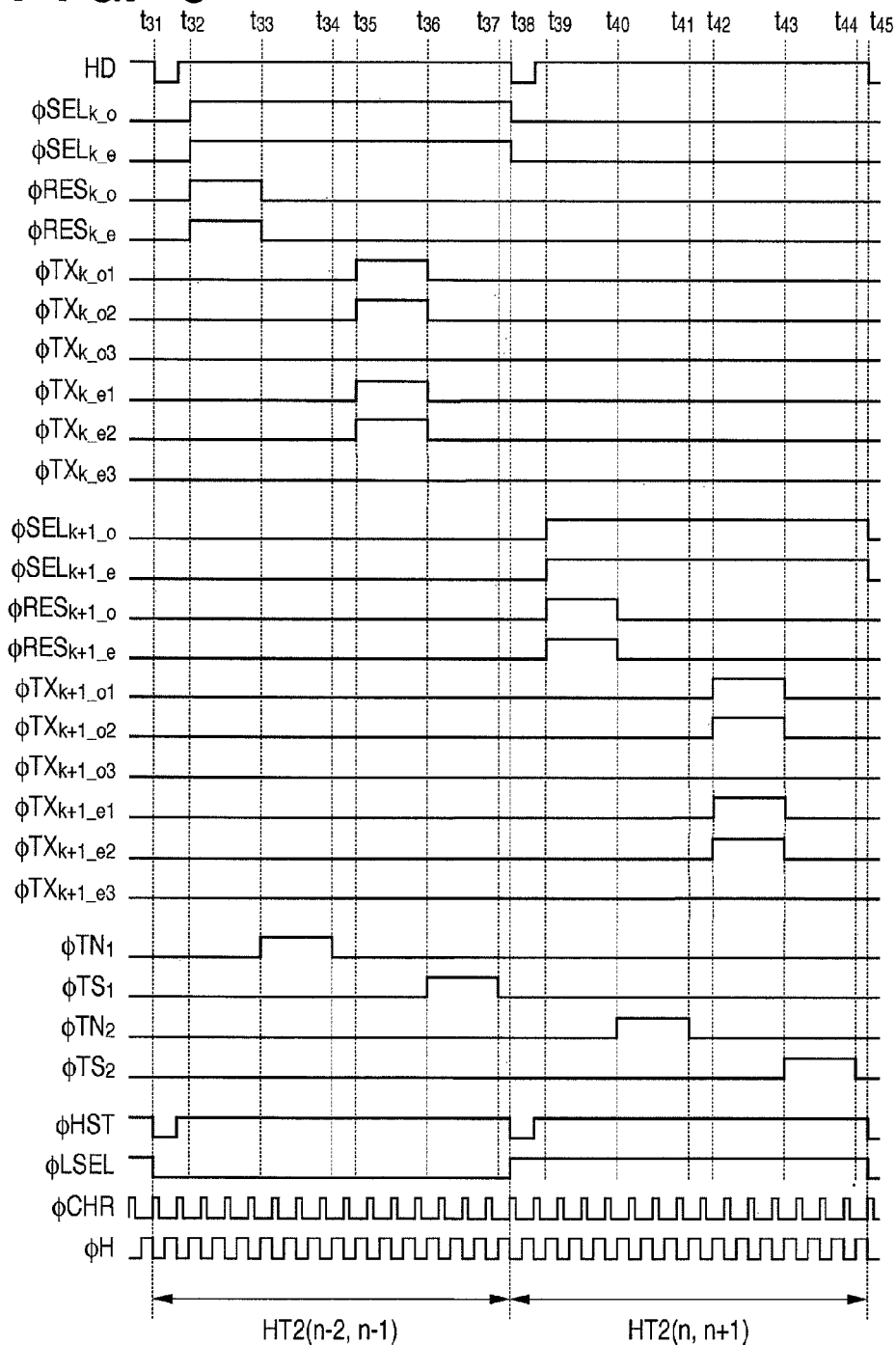
FIG. 3 is a timing chart showing driving timings (adding readout mode) when adding and reading out signals from two of three photoelectric conversion units in each pixel unit of the image sensor according to the first embodiment of the present invention.

FIG. 3 shows driving timings (adding readout mode) when adding and reading out signals from two of three photoelectric conversion units in each pixel unit of the image sensor according to the first embodiment of the present invention. Three photoelectric conversion units arranged in the direction along the column in each pixel unit will be called the first photoelectric conversion unit, second photoelectric conversion unit, and third photoelectric conversion unit sequentially from the top. Three transfer units arranged in the direction along the column in each pixel unit will be called the first transfer unit, second transfer unit, and third transfer unit sequentially from the top.

In a period of times $t_{31}$ to $t_{38}$, the horizontal scanning circuit 224-1 transfers, to the first output amplifier 225-1, the signals of pixel units on the (n−2)th row that are held in the first holding block 240-1. This signal is the sum of the signals of the first and second photoelectric conversion units in each pixel unit on the (n−2)th row. Parallel to this, the horizontal scanning circuit 224-2 transfers, to the second output amplifier 225-2, the signals of pixel units on the (n−1)th row that are held in the second holding block 240-2. The signal is the sum of the signals of the first and second photoelectric conversion units in each pixel unit on the (n−1)th row. The horizontal transfer operation for the signals of the pixel units on the (n−2)th and (n−1)th rows continues during the period of times $t_{31}$ to $t_{38}$. That is, the period of times $t_{31}$ to $t_{38}$ serves as a horizontal transferring period HT2 (n−2, n−1) for the signals of the pixel units on the (n−2)th and (n−1)th rows.

Similarly, a horizontal transfer operation for the signals of pixel units on the (n)th and (n+1)th rows is performed during a period of times $t_{38}$ to $t_{45}$. That is, the period of times $t_{38}$ to $t_{45}$ serves as a horizontal transferring period HT2 (n, n+1) for the signals of the pixel units on the (n)th and (n+1)th rows.

At time $t_{32}$ in the horizontal transferring period HT2 (n−2, n−1), the vertical scanning circuit 61 supplies active-level selection control signals $\phi SEL_{k\_o}$ and $\phi SEL_{k\_e}$ to the pixel units on the (n)th and (n+1)th rows to select them.

The vertical scanning circuit 61 supplies active-level reset control signals $\phi RES_{k\_o}$ and $\phi RES_{k\_e}$ to the pixel units on the (n)th and (n+1)th rows. In the pixel units on the (n)th row, the reset units reset the charge-voltage converters, and the output units output noise signals corresponding to the voltages of the charge-voltage converters to the first vertical output lines VL1-1 to VL4-1. Parallel to this, in the pixel units on the (n+1)th row, the reset units reset the charge-voltage converters, and the output units output noise signals corresponding to the voltages of the charge-voltage converters to the second vertical output lines VL1-2 to VL4-2.

At time $t_{33}$ in the horizontal transferring period HT2 (n−2, n−1), $\phi TN_1$ changes to an active level to turn on the transfer gates 211 (see FIG. 11) of respective columns in the first holding block 240-1 and second holding block 240-2. Accordingly, the noise signals of the pixel units on the (n)th row that have been output to the first vertical output lines VL1-1 to VL4-1 are transferred to the holding capacitances

215 (see FIG. 11) of the respective columns in the first holding block 240-1. Parallel to this, the noise signals of the pixel units on the (n+1)th row that have been output to the second vertical output lines VL1-2 to VL4-2 are transferred to the holding capacitances 215 of the respective columns in the second holding block 240-2.

At time $t_{34}$ in the horizontal transferring period HT2 (n−2, n−1), φTN$_1$ changes to a nonactive level to turn off the transfer gates 211 of the respective columns in the first holding block 240-1 and second holding block 240-2. In response to this, the holding capacitances 215 of the respective columns in the first holding block 240-1 hold the transferred noise signals of the pixel units on the (n)th row. The holding capacitances 215 of the respective columns in the second holding block 240-2 hold the transferred noise signals of the pixel units on the (n+1)th row.

At time $t_{35}$ in the horizontal transferring period HT2 (n−2, n−1), the vertical scanning circuit 61 supplies active-level transfer control signals φTX$_{k\_o1}$ and φTX$_{k\_o2}$ to the first and second transfer units of the pixel units on the (n)th row. In the pixel units on the (n)th row, the first and second transfer units transfer the charges of the first and second photoelectric conversion units to the charge-voltage converters. In the pixel units on the (n)th row, the charge-voltage converters add the charges of the first and second photoelectric conversion units, and convert the added charges into voltages. The output units output optical signals corresponding to the voltages of the charge-voltage converters to the first vertical output lines VL1-1 to VL4-1. That is, the pixel units (first pixel units) on the (n)th row perform the first adding operation.

Parallel to this, the vertical scanning circuit 61 supplies active-level transfer control signals φTX$_{k\_e1}$ and φTX$_{k\_e2}$ to the first and second transfer units of the pixel units on the (n+1)th row. In the pixel units on the (n+1)th row, the first and second transfer units transfer the charges of the first and second photoelectric conversion units to the charge-voltage converters. In the pixel units on the (n+1)th row, the charge-voltage converters add the charges of the first and second photoelectric conversion units, and convert the added charges into voltages. In the pixel units on the (n+1)th row, the output units output optical signals corresponding to the voltages of the charge-voltage converters to the second vertical output lines VL1-2 to VL4-2. That is, the pixel units (second pixel units) on the (n+1)th row execute the second adding operation.

At time $t_{36}$ in the horizontal transferring period HT2 (n−2, n−1), the vertical scanning circuit 61 changes the transfer control signals φTX$_{k\_o1}$, φTX$_{k\_o2}$, φTX$_{k\_e1}$, and φTX$_{k\_e2}$ to a nonactive level. Also, φTS$_1$ changes to an active level to turn on the transfer gates 210 (see FIG. 11) of the respective columns in the first holding block 240-1 and second holding block 240-2. Then, the optical signals of the pixel units on the (n)th row that have been output to the first vertical output lines VL1-1 to VL4-1 are transferred to the holding capacitances 214 (see FIG. 11) of the respective columns in the first holding block 240-1. This optical signal is the sum of the signals of the first and second photoelectric conversion units in each pixel unit on the (n)th row. Parallel to this, the optical signals of the pixel units on the (n+1)th row that have been output to the second vertical output lines VL1-2 to VL4-2 are transferred to the holding capacitances 214 of the respective columns in the second holding block 240-2. This optical signal is the sum of the signals of the first and second photoelectric conversion units in each pixel unit on the (n+1)th row.

At time $t_{37}$ in the horizontal transferring period HT2 (n−2, n−1), φTS$_1$ changes to a nonactive level to turn off the transfer gates 210 of the respective columns in the first holding block 240-1 and second holding block 240-2. The holding capacitances 214 of the respective columns in the first holding block 240-1 hold the transferred optical signals of the pixel units on the (n)th row. The holding capacitances 214 of the respective columns in the second holding block 240-2 hold the transferred optical signals of the pixel units on the (n+1)th row.

At time $t_{38}$ in the horizontal transferring period HT2 (n−2, n−1), the vertical scanning circuit 61 supplies nonactive-level selection control signals φSEL$_{k\_o}$ and φSEL$_{k\_e}$ to the pixel units on the (n)th and (n+1)th rows to deselect them.

At time $t_{39}$ in the horizontal transferring period HT2 (n, n+1), the vertical scanning circuit 61 supplies active-level selection control signals φSEL$_{k+1\_o}$ and φSEL$_{k+1\_e}$ to the pixel units on the (n+2)th and (n+3)th rows to select them.

This operation can be executed in turn to add the charges of two photoelectric conversion units vertically (direction along the column) and read out the added charges. In comparison with the operation shown in FIG. 2, the operation shown in FIG. 3 can reduce, to ⅓, the length of the period to transfer signals from the pixel unit array to the holding block.

The layout of the image sensor 100 according to the first embodiment of the present invention will be described with reference to FIGS. 4A and 4B. FIGS. 4A and 4B are views each showing the layout of the image sensor 100 according to the first embodiment of the present invention. Each of FIGS. 4A and 4B does not illustrate components of each pixel unit other than the photoelectric conversion unit, charge-voltage converter, and color filter. In each of FIGS. 4A and 4B, the photoelectric conversion unit and color filter overlap each other.

Arrows shown in FIG. 4A indicate the operation described with reference to FIG. 2 to read out the signals of three photoelectric conversion units in each pixel unit without adding them. Arrows shown in FIG. 4B indicate the operation described with reference to FIG. 3 to add and read out the signals of two of three photoelectric conversion units in each pixel unit.

As shown in FIG. 4A, the array of color filters in the pixel unit array PUA forms a Bayer array. On each column of the pixel unit array PUA, color filters of the same color are arranged every other color filter. In correspondence with this, each pixel unit is configured to output the signals of three photoelectric conversion units arranged every other photoelectric conversion unit to the vertical output line via the charge-voltage converter. Each of two vertical output lines arranged on the right and left sides of each column of the pixel unit array PUA receives signals of the same color from pixel units, and transfers them to the holding block.

As shown in FIG. 4B, the charges (signal) of the photoelectric conversion unit 1 corresponding to the R color filter CF1 and those of the photoelectric conversion unit 3 corresponding to the R color filter CF3, are added in the charge-voltage converter 15 in the first pixel unit PU11. At this time, the center of gravity of the added signal coincides with the position of the hatched photoelectric conversion unit 2. In FIG. 4B, the color of the signal at the position of the photoelectric conversion unit 2 after addition differs from that before addition, as represented by a parenthesized color.

The charges (signal) of the photoelectric conversion unit 4 corresponding to the Gb color filter CF4 and those of the photoelectric conversion unit 6 corresponding to the Gb color filter CF6, are added in the charge-voltage converter 16 in the second pixel unit PU21. At this time, the center of gravity of the added signal coincides with the position of the hatched photoelectric conversion unit 5. In FIG. 4B, the color of the signal at the position of the photoelectric conversion unit 5 after addition differs from that before addition, as represented by a parenthesized color.

In the pixel unit array PUA, as shown in FIG. 4B, neither of two photoelectric conversion units to undergo addition in the second pixel unit is interposed between two photoelectric conversion units to undergo addition in the first pixel unit. On each column of the pixel unit array PUA, two photoelectric conversion units to undergo addition in the first pixel unit and two photoelectric conversion units to undergo addition in the second pixel unit are arranged alternately in the direction along the column. Added signals form a Bayer array, and the centers of gravity of the added signals appear at equal intervals, as represented by hatching. This layout can suppress generation of a pseudo signal such as moiré.

Note that each pixel unit may include one or more photoelectric conversion units, one or more transfer units, and one or more color filters. In other words, in each pixel unit, the charge-voltage converter, reset unit, output unit, and selection unit may not be shared, similar to the pixel in FIG. 11. Even in this case, pixel units on two rows parallel-transfer signals to the two holding blocks 240-1 and 240-2. Hence, compared to the image sensor shown in FIG. 11, the image sensor in the first embodiment can substantially halve the length of the period to transfer signals from the pixel unit array to the holding block.

Figure 5:
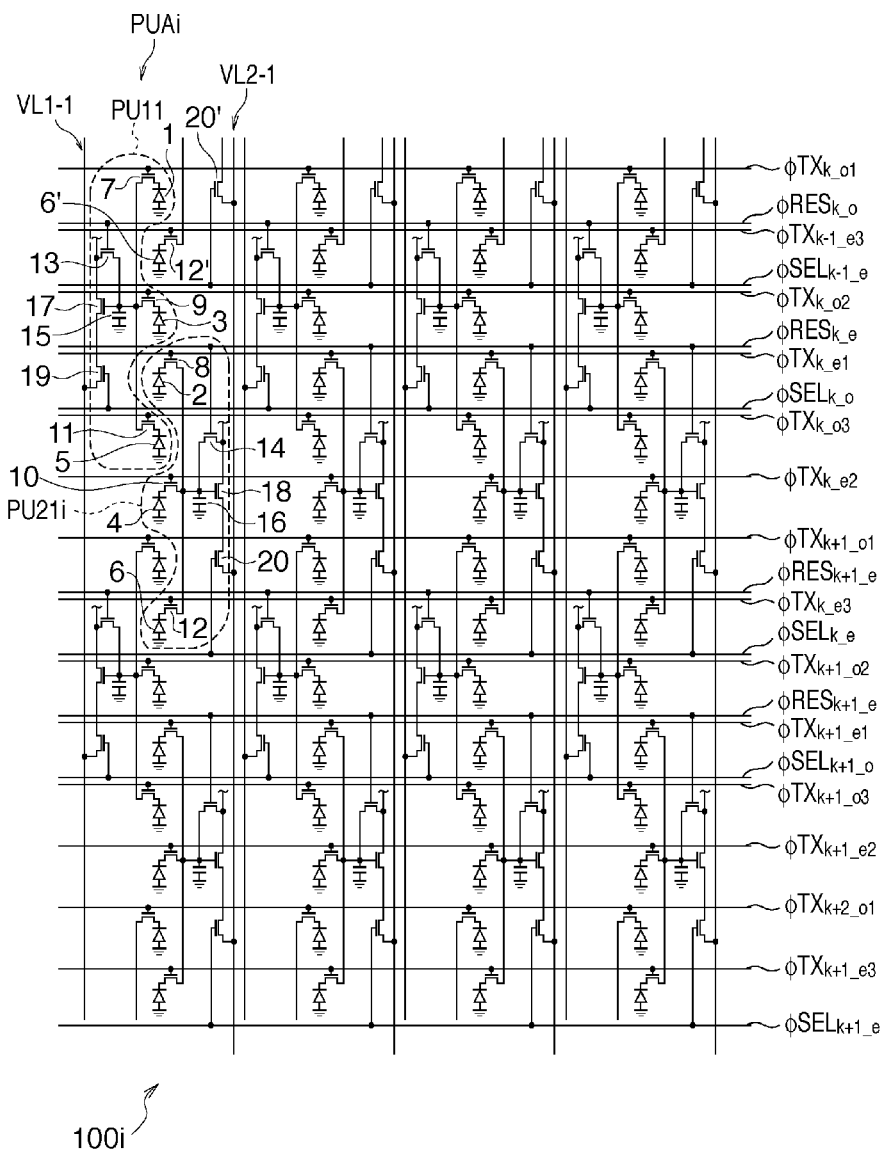
FIG. 5 is a circuit diagram showing the arrangement of an image sensor 100$i$ according to the second embodiment of the present invention.

An image sensor 100$i$ according to the second embodiment of the present invention will be described with reference to FIG. 5. FIG. 5 is a circuit diagram showing the arrangement of the image sensor 100$i$ according to the second embodiment of the present invention. A difference from the first embodiment will be mainly explained.

The image sensor 100$i$ includes a pixel unit array PUAi. On each column of the pixel unit array PUAi, the relative positions of a first pixel unit PU11 and second pixel unit PU21$i$ differ from those in the first embodiment.

In the first embodiment, the photoelectric conversion unit 2 of the second pixel unit is interposed between the photoelectric conversion units 1 and 3 of the first pixel unit. The photoelectric conversion unit 4 of the second pixel unit is interposed between the photoelectric conversion units 3 and 5 of the first pixel unit. The photoelectric conversion unit 5 of the first pixel unit is interposed between the photoelectric conversion units 4 and 6 of the second pixel unit.

In the second embodiment, a photoelectric conversion unit 2 of a second pixel unit is interposed between photoelectric conversion units 3 and 5 of a first pixel unit. The photoelectric conversion unit 5 of the first pixel unit is interposed between the photoelectric conversion unit 2 and a photoelectric conversion unit 4 of the second pixel unit.

Figure 6:
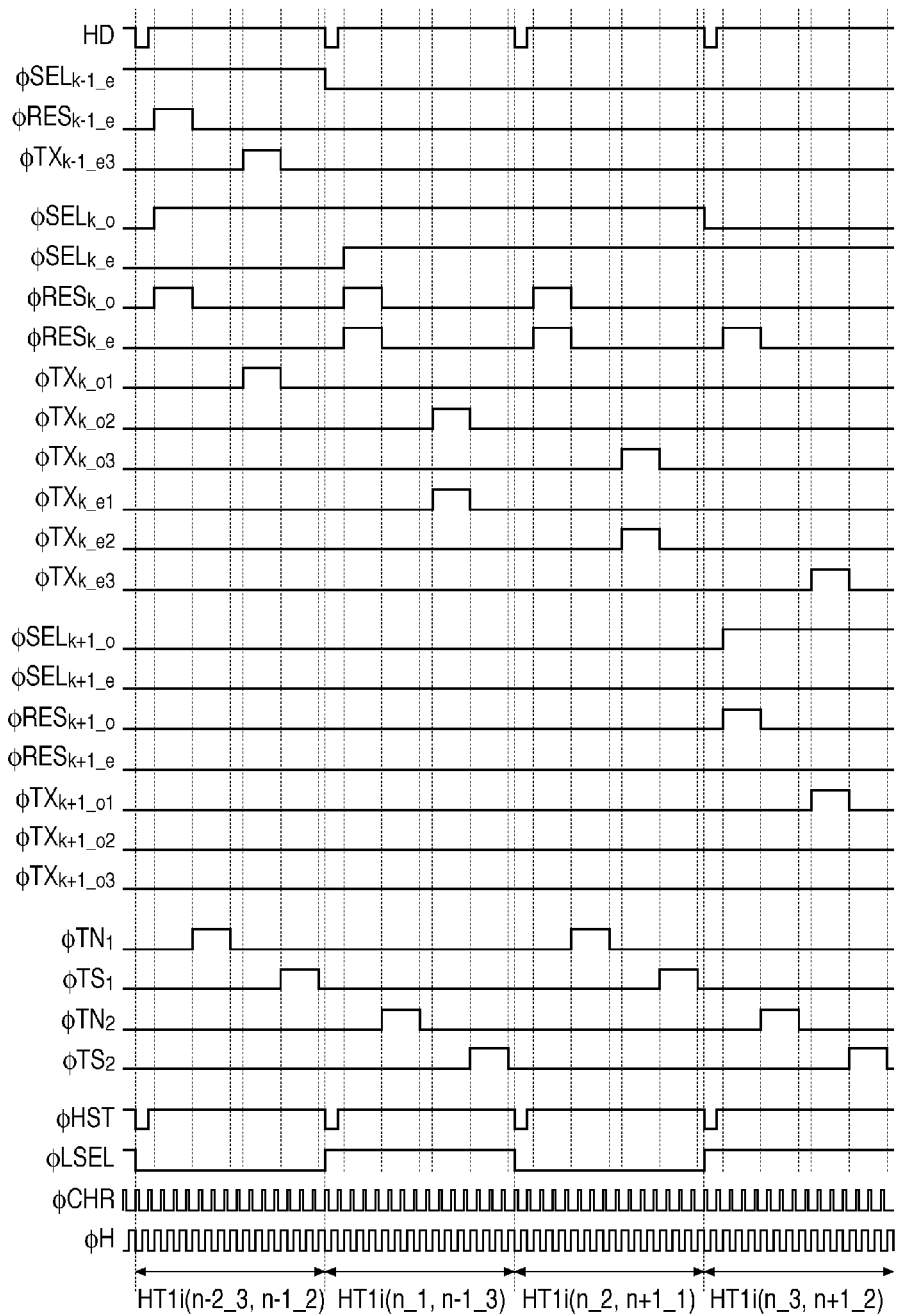
FIG. 6 is a timing chart showing driving timings (full pixel readout mode) when reading out signals from three photoelectric conversion units in each pixel unit of the image sensor without adding the signals according to the second embodiment of the present invention.
Figure 7:
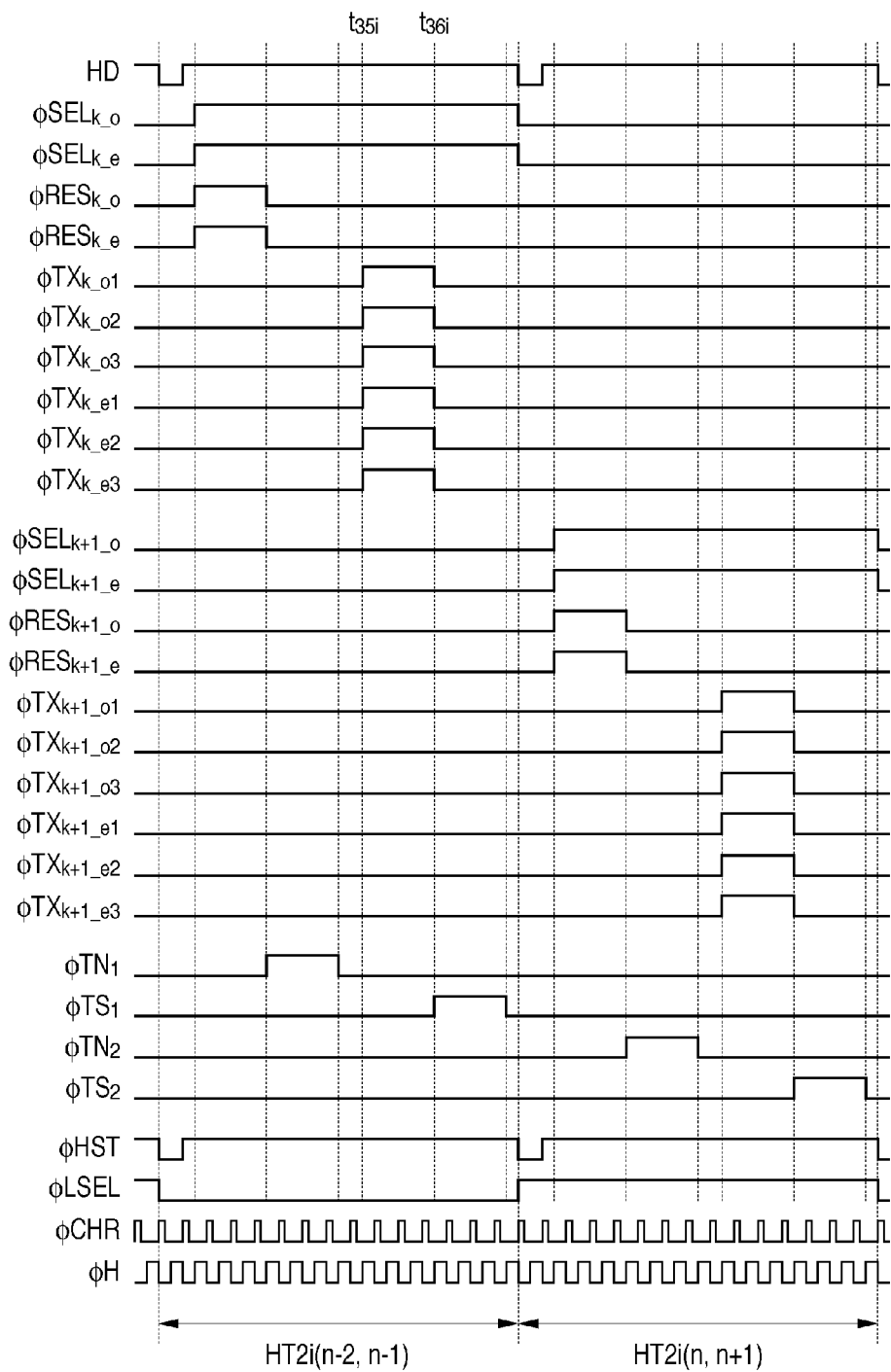
FIG. 7 is a timing chart showing driving timings (adding readout mode) when adding and reading out signals from all three photoelectric conversion units in each pixel unit of the image sensor according to the second embodiment of the present invention.

The operation of the image sensor is different from the first embodiment in the following point, as shown in FIGS. 6 and 7.

FIG. 6 shows driving timings (full pixel readout mode) when reading out signals from three photoelectric conversion units in each pixel unit of the image sensor without adding the signals according to the second embodiment of the present invention. Three photoelectric conversion units arranged in the direction along the column in each pixel unit will be called the first photoelectric conversion unit, second photoelectric conversion unit, and third photoelectric conversion unit sequentially from the top. Three transfer units arranged in the direction along the column in each pixel unit will be called the first transfer unit, second transfer unit, and third transfer unit sequentially from the top.

In the operation to read out signals from three photoelectric conversion units in each pixel unit without adding the signals, the operation of the second pixel unit shifts from that of the first pixel unit by one horizontal scanning period, as shown in FIG. 6 (see FIG. 2).

More specifically, in a horizontal transferring period HT1$i$ (n–2_3, n–1_2), the signals of the third photoelectric conversion units on the (n–2)th row and those of the second photoelectric conversion units on the (n–1)th row are transferred horizontally.

In a horizontal transferring period HT1$i$ (n_1, n–1_3), the signals of the first photoelectric conversion units on the (n)th row and those of the third photoelectric conversion units on the (n–1)th row are transferred horizontally.

In a horizontal transferring period HT1$i$ (n_2, n+1_1), the signals of the second photoelectric conversion units on the (n)th row and those of the first photoelectric conversion units on the (n+1)th row are transferred horizontally.

In a horizontal transferring period HT1$i$ (n_3, n+1_2), the signals of the third photoelectric conversion units on the (n)th row and those of the second photoelectric conversion units on the (n+1)th row are transferred horizontally.

The signal waveforms of $\phi SEL_{k-1\_e}$, $\phi RES_{k-1\_e}$, $\phi TX_{k-1\_e3}$, $\phi RES_{k\_e}$, $\phi SEL_{k+1\_e}$, and $\phi RES_{k+1\_e}$ are delayed from those in FIG. 2 by one horizontal scanning period.

That is, a signal transfer operation from the first photoelectric conversion unit of the second pixel unit to the second holding block shifts by one horizontal scanning period from a signal transfer operation from the first photoelectric conversion unit of the first pixel unit to the first holding block.

A signal transfer operation from the second photoelectric conversion unit of the second pixel unit to the second holding block shifts by one horizontal scanning period from a signal transfer operation from the second photoelectric conversion unit of the first pixel unit to the first holding block.

A signal transfer operation from the third photoelectric conversion unit of the second pixel unit to the second holding block shifts by one horizontal scanning period from a signal transfer operation from the third photoelectric conversion unit of the first pixel unit to the first holding block.

Even in this case, pixel units on two rows parallel-transfer signals to two holding blocks 240-1 and 240-2. Compared to the image sensor shown in FIG. 11, the image sensor in the second embodiment can substantially halve the length of the period to transfer signals from the pixel unit array to the holding block.

FIG. 7 shows driving timings (adding readout mode) when adding and reading out signals from all three photoelectric conversion units in each pixel unit of the image sensor according to the second embodiment of the present invention. Three photoelectric conversion units arranged in the direction along the column in each pixel unit will be called the first photoelectric conversion unit, second photoelectric conversion unit, and third photoelectric conversion unit sequentially from the top. Three transfer units arranged in the direction along the column in each pixel unit will be called the first transfer unit, second transfer unit, and third transfer unit sequentially from the top.

At time $t_{35i}$ in a horizontal transferring period HT2$i$ (n–2, n–1), a vertical scanning circuit 61 supplies active-level transfer control signals $\phi TX_{k\_o1}$ to $\phi TX_{k\_o3}$ to the first to third transfer units of pixel units on the (n)th row. In the pixel units on the (n)th row, the first to third transfer units transfer the charges of the first to third photoelectric conversion units to the charge-voltage converters. In the pixel units on the (n)th row, the charges of the first to third photoelectric conversion units are added in the charge-voltage converters, and the charge-voltage converters convert the added charges into voltages. The output units output optical signals corresponding to the voltages of the charge-voltage converters to first vertical output lines VL1-1 to VL4-1. That is, the pixel units (first pixel units) on the (n)th row perform the third adding operation (to be described later).

Parallel to this, the vertical scanning circuit 61 supplies active-level transfer control signals $\phi TX_{k\_e1}$ to $\phi TX_{k\_e3}$ to the first to third transfer units of pixel units on the (n+1)th row. In the pixel units on the (n+1)th row, the first to third transfer units transfer the charges of the first to third photoelectric conversion units to the charge-voltage converters. In the pixel units on the (n+1)th row, the charges of the first to third photoelectric conversion units are added in the charge-voltage converters, and the charge-voltage converters convert the added charges into voltages. In the pixel units on the (n+1)th row, the output units output optical signals corresponding to the voltages of the charge-voltage converters to second vertical output lines VL1-2 to VL4-2. That is, the pixel units (second pixel units) on the (n+1)th row execute the fourth adding operation (to be described later).

At time $t_{36i}$ in the horizontal transferring period HT2$i$ (n−2, n−1), the vertical scanning circuit 61 changes the transfer control signals $\phi TX_{k\_o1}$ to $\phi TX_{k\_o3}$, and $\phi TX_{k\_e1}$ to $\phi TX_{k\_e3}$ to a nonactive level.

A driving unit 130 executes the following operation when each of pixel units includes 2N+1 photoelectric conversion units arranged in the direction along the column, 2N+1 transfer units, and 2N+1 color filters arranged in the direction along the column. The driving unit 130 drives the pixel unit array PUA to parallel-perform the third and fourth adding operations. In the third adding operation, 2M+1 transfer units in the first pixel unit transfer the charges of 2M+1 photoelectric conversion units to the charge-voltage converter to add them. The charge-voltage converter converts the added charges into a voltage. The output unit outputs a signal corresponding to the voltage of the charge-voltage converter to the first vertical output line. M is a positive integer equal to or smaller than N. In the fourth adding operation, 2M+1 transfer units in the second pixel unit transfer the charges of 2M+1 photoelectric conversion units to the charge-voltage converter to add them. The charge-voltage converter converts the added charges into a voltage. The output unit outputs a signal corresponding to the voltage of the charge-voltage converter to the second vertical output line.

Figure 8:
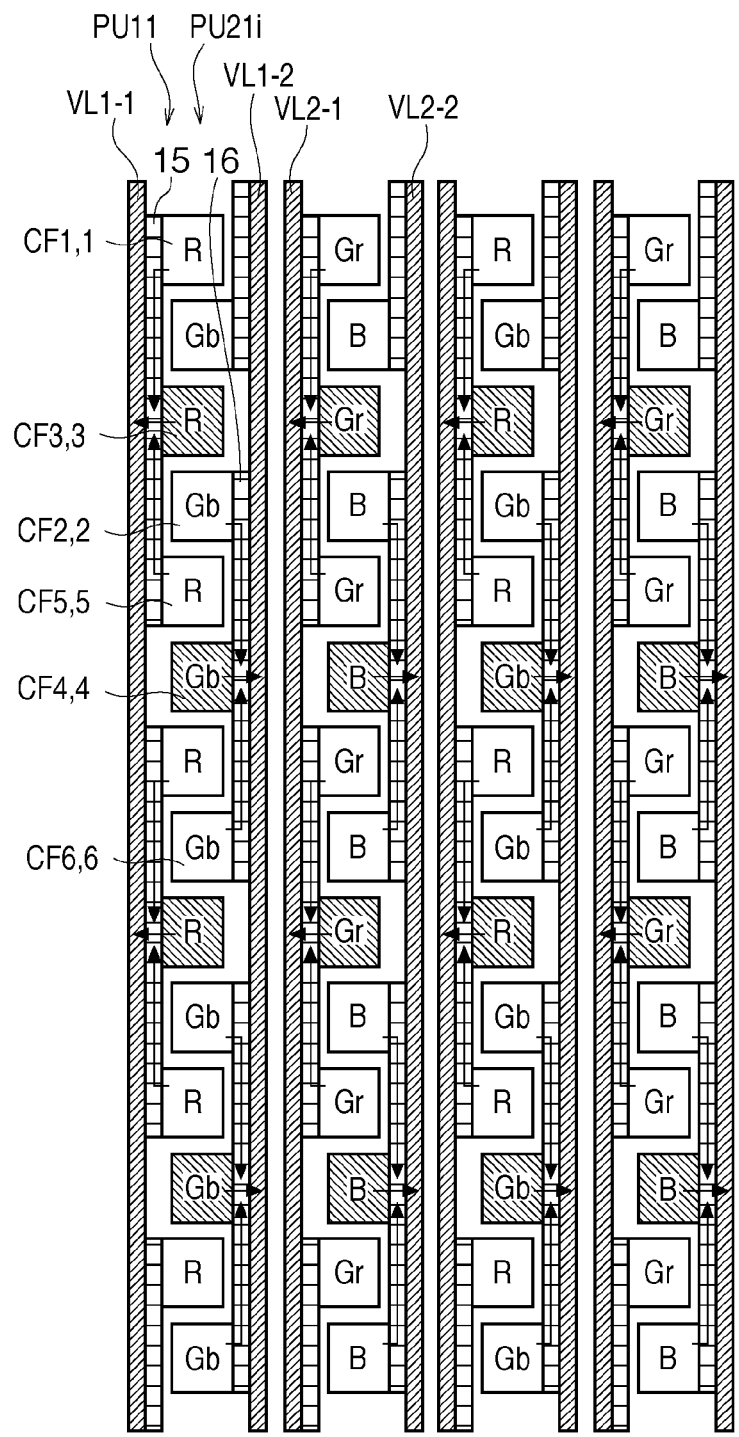
FIG. 8 is a view showing the layout of the image sensor 100$i$ according to the second embodiment of the present invention.

As shown in FIG. 8, the layout of the image sensor is different from that in the first embodiment in the following point. FIG. 8 is a view showing the layout of the image sensor 100$i$ according to the second embodiment of the present invention.

As shown in FIG. 8, the relative positions of the first pixel unit PU11 and second pixel unit PU21$i$ differ from those in the layout shown in FIG. 4.

As shown in FIG. 8, the charges (signals) of photoelectric conversion units 1, 3, and 5 corresponding to R color filters CF1, CF3, and CF5, are added in the charge-voltage converter 15 in the first pixel unit PU11. At this time, the center of gravity of the added signal coincides with the position of the hatched photoelectric conversion unit 3. In FIG. 8, the color of the signal at the position of the photoelectric conversion unit 3 after addition is the same as that before addition.

The charges (signals) of photoelectric conversion units 2, 4, and 6 corresponding to Gb color filters CF2, CF4, and CF6, are added in the charge-voltage converter 16 in the second pixel unit PU21$i$. At this time, the center of gravity of the added signal coincides with the position of the hatched photoelectric conversion unit 4. In FIG. 8, the color of the signal at the position of the photoelectric conversion unit 4 after addition is the same as that before addition.

As shown in FIG. 8, on each column of the pixel unit array PUAi, three photoelectric conversion units to undergo addition in the first pixel unit and a central one of three photoelectric conversion units to undergo addition in the second pixel unit are arranged alternately in the direction along the column. Added signals form a Bayer array, and the centers of gravity of the added signals appear at equivalent intervals, as represented by hatching. This layout can suppress generation of a pseudo signal such as moiré.

Figure 9:
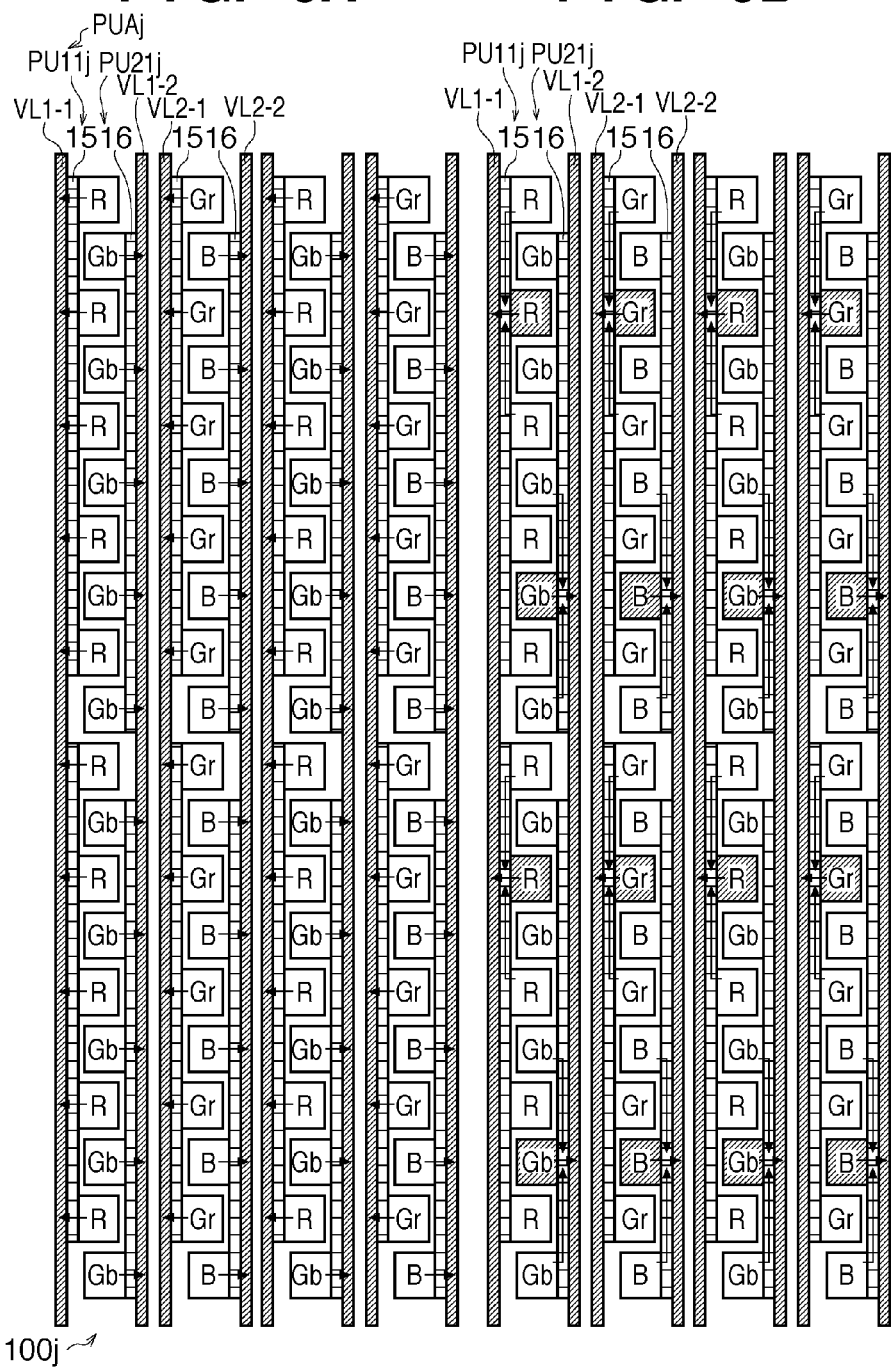
FIGS. 9A and 9B are views each showing the layout of an image sensor 100$j$ according to the third embodiment of the present invention.

An image sensor 100$j$ according to the third embodiment of the present invention will be described with reference to FIGS. 9A and 9B. FIGS. 9A and 9B are views each showing the layout of the image sensor 100$j$ according to the third embodiment of the present invention. Each of FIGS. 9A and 9B does not illustrate components of each pixel unit other than a photoelectric conversion unit, charge-voltage converter, and color filter. In each of FIGS. 9A and 9B, the photoelectric conversion unit and color filter overlap each other. A difference from the first embodiment will be mainly described.

The image sensor 100$j$ includes a pixel unit array PUAj. In each pixel unit of the pixel unit array PUAj, five pixels arranged every other pixel in the direction along the column in each of FIGS. 9A and 9B share a charge-voltage converter, reset unit, output unit, and selection unit.

Arrows shown in FIG. 9A indicate an operation to read out the signals of five photoelectric conversion units in each pixel unit without adding them. Arrows shown in FIG. 9B indicate an operation to add and read out the signals of three of five photoelectric conversion units in each pixel unit.

As shown in FIG. 9A, the array of color filters in the pixel unit array PUAj forms a Bayer array. On each column of the pixel unit array PUAj, color filters of the same color are arranged every other color filter. In correspondence with this, each pixel unit is configured to output the signals of five photoelectric conversion units arranged every other photoelectric conversion unit to the vertical output line via the charge-voltage converter. Each of two vertical output lines arranged on the right and left sides of each column of the pixel unit array PUAj receives signals of the same color from pixel units, and transfers them to the holding block.

As shown in FIG. 9B, the charges (signals) of three photoelectric conversion units corresponding to R color filters are added in the charge-voltage converter 15 in the first pixel unit PU11$j$. At this time, the center of gravity of the added signal coincides with the position of a hatched photoelectric conversion unit. In FIG. 9B, the color of the signal at the position of the photoelectric conversion unit after addition is the same as that before addition.

The charges (signals) of three photoelectric conversion units 4 corresponding to Gb color filters are added in the charge-voltage converter 16 in a second pixel unit PU21$j$. At this time, the center of gravity of the added signal coincides with the position of a hatched photoelectric conversion unit. In FIG. 9B, the color of the signal at the position of the photoelectric conversion unit after addition is the same as that before addition.

In the pixel unit array PUAj, as shown in FIG. 9B, none of three photoelectric conversion units to undergo addition in the second pixel unit is interposed between three photoelectric conversion units to undergo addition in the first pixel unit. On each column of the pixel unit array PUAj, three photoelectric conversion units to undergo addition in the first pixel unit and three photoelectric conversion units to undergo addition in the second pixel unit are arranged alternately in the direction along the column. Added signals form a Bayer array, and the centers of gravity of the added signals appear at equivalent intervals, as represented by hatching. This layout can suppress generation of a pseudo signal such as moiré.

Figure 10:
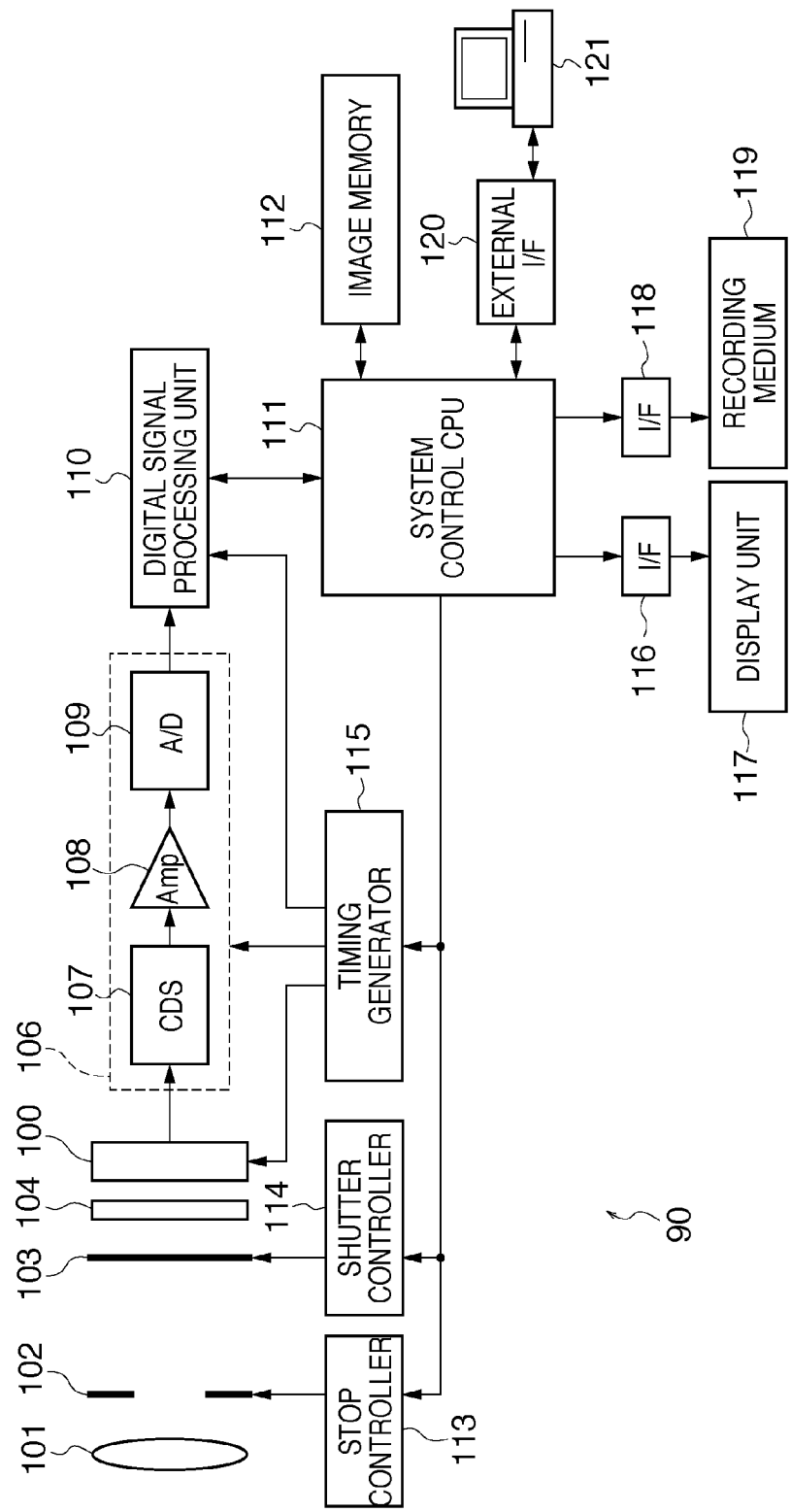
FIG. 10 is a block diagram showing the arrangement of an image sensing apparatus using the image sensor according to the first embodiment of the present invention.

An image sensing apparatus using the image sensor according to the first embodiment of the present invention will be described with reference to FIG. 10. FIG. 10 is a block diagram showing the arrangement of the image sensing apparatus using the image sensor according to the first embodiment of the present invention.

An image sensing apparatus 90 is, for example, a digital still camera. The image sensing apparatus 90 includes the following building components.

A lens (optical system) 101 refracts incident light to form the image of an object on the pixel array (image sensing plane) of an image sensor 100.

A stop 102 is interposed between the lens 101 and the image sensor 100 on the optical path. The stop 102 adjusts the quantity of light guided to the image sensor 100 after passing through the lens 101.

A stop controller 113 controls the opening degree of the stop 102 in accordance with an instruction from a system control CPU 111.

A mechanical shutter 103 controls light to be incident on the image sensor 100 after passing through the lens 101. In other words, the mechanical shutter 103 controls exposure of the image sensor 100.

An optical filter 104 restricts the wavelength or spatial frequency of light to be incident on the image sensor 100.

The image sensor 100 converts the image of an object formed on the pixel array into an image signal. The image sensor 100 reads out the image signal from the pixel array and outputs it.

An analog front end 106 performs predetermined analog processing for the image signal output from the image sensor 100. More specifically, the analog front end 106 includes a CDS (Correlated Double Sampling) circuit 107, amplifier (Amp) 108, and A/D converter 109. The CDS circuit 107 receives an image signal output from the image sensor 100, and performs CDS processing for the received image signal to remove noise. The CDS circuit 107 supplies the noise-free image signal to the amplifier 108. The amplifier 108 amplifies the supplied image signal by a gain adjusted in advance by the system control CPU 111. The amplifier 108 supplies the amplified image signal to the A/D converter 109. The A/D converter 109 A/D-converts the supplied image signal (analog signal) to generate and output an image signal (digital signal).

A digital signal processing unit 110 generates image data by executing a variety of processes such as correction processing and compression processing for the image signal (digital signal) output from the analog front end 106. The digital signal processing unit 110 supplies the generated image data to an image memory 112, external interface (external I/F) 120, display interface (I/F) 116, recording interface (I/F) 118, and the like via the system control CPU 111.

A timing generator 115 generates various timing signals based on an instruction from the system control CPU 111. The timing generator 115 supplies the generated timing signals to the image sensor 100, analog front end 106, and digital signal processing unit 110.

The system control CPU 111 comprehensively controls the units of the image sensing apparatus 90.

The image memory 112 receives image data from the digital signal processing unit 110 via the system control CPU 111, and temporarily stores the received image data.

The display interface 116 receives image data from the digital signal processing unit 110 via the system control CPU 111, and converts the received image data into a display image signal. The display interface 116 displays an image corresponding to the display image signal on a display unit 117. The display unit 117 is, for example, a liquid crystal display.

The recording interface 118 receives image data from the digital signal processing unit 110 via the system control CPU 111, and converts the received image data into compressed image data for recording. The recording interface 118 records the compressed image data on a recording medium 119. The recording interface 118 reads out compressed image data from the recording medium 119, and decompresses the readout compressed image data to convert it into image data. The recording interface 118 supplies the converted image data to the system control CPU 111. The recording medium 119 is, for example, a detachable recording medium such as a semiconductor memory.

The external interface 120 is used to communicate with an external computer 121 or the like.

The operation of the image sensing apparatus 90 will be explained.

Upon turning on a power switch (not shown), the main power supply is turned on, the power supply of the control system is turned on, and then that of the image sensing circuit including the analog front end 106 is turned on.

To control the exposure, the system control CPU 111 opens the stop 102 to a full-aperture value via the stop controller 113, and opens the mechanical shutter 103 via a shutter controller 114. The analog front end 106 converts a signal output from the image sensor 100 and inputs the converted signal to the digital signal processing unit 110. The system control CPU 111 calculates an exposure based on the data.

The system control CPU 111 determines brightness as a result of photometry, and controls the stop in accordance with the determination result.

The system control CPU 111 extracts a high-frequency component from the signal output from the image sensor 100, and calculates (measures) the distance to the object. Then, the system control CPU 111 drives the lens to determine whether the object is in focus. If the system control CPU 111 determines that the object is out of focus, it drives the lens again to measure the distance.

After confirming that the object is in focus, the system control CPU 111 starts/ends actual exposure of the image sensor 100 using the electronic shutter function of the image sensor 100.

The system control CPU 111 may start/end actual exposure of the image sensor 100 by opening/closing the mechanical shutter 103.

After that, the system control CPU 111 controls to sequentially output the image signals of pixel units on respective columns in the pixel unit array of the image sensor 100. When outputting image signals from the image sensor 100, the system control CPU 111 can control a mode selection unit (not shown) to select either the full pixel readout mode or adding readout mode as the driving mode of the image sensor 100. The analog front end 106 performs predetermined analog processing (noise removal such as correlated double sampling, amplification processing, and A/D conversion processing) for an image signal output from the image sensor 100, and digitizes the image signal. The digital signal processing unit 110 converts the digital image signal into image data. The image data is written in the image memory 112 under the control of the system control CPU. The image data stored in the image memory 112 is recorded on the detachable recording medium 119 such as a semiconductor memory via the recording interface 118 under the control of the system control CPU 111. Captured image data is displayed as an image on the display unit 117 such as a liquid crystal display via the display interface 116. Alternatively, captured image data is directly input to the computer 121 or the like via the external interface 120. The user may process an image corresponding to the image data via the computer 121.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-272353, filed Oct. 22, 2008 which is hereby incorporated by reference herein in its entirety.

The invention claimed is:

1. An image sensor comprising:
   a pixel array including a plurality of first photoelectric converters configured to generate first color voltage signals, and a plurality of second photoelectric converters configured to generate second color voltage signals, wherein each of the first photoelectric converters and each of the second photoelectric converters are arranged alternately in a column direction along each column of the pixel array;
   a first output line in the column direction and to which the first color voltage signals are output; and
   a second output line in the column direction and to which the second color voltage signals are output,
   wherein the pixel array is driven to perform in parallel:
      a first operation to output the first color voltage signals which depend on charges of 2M or 2M+1 (M being a positive integer) of the first photoelectric converters which are arranged in the column direction to the first output line at one time, and
      a second operation to output the second color voltage signals which depend on charges of 2M or 2M+1 of the second photoelectric converters which are arranged in the column direction to the second output line at one time.

2. The sensor according to claim 1, further comprising a driver which drives the pixel array to perform the first and second operations in parallel.

3. The sensor according to claim 1, wherein the pixel array is arranged adjacent to the first output line on a first side, and is arranged adjacent to the second output line on a second side opposite to the first side.

4. The sensor according to claim 1, wherein the pixel array includes a plurality of first color filters for guiding light of the first color to the first photoelectric converters and a plurality of second color filters for guiding light of the second color to the second photoelectric converters.

5. The sensor according to claim 1, wherein the pixel array includes a plurality of columns, and the plurality of first color filters and the plurality of second color filters are arranged to form a Bayer array.

6. An image sensing apparatus comprising:
   a sensor including
      a pixel array including a plurality of first photoelectric converters configured to generate first color voltage signals, and a plurality of second photoelectric converters configured to generate second color voltage signals, wherein each of the first photoelectric converters and each of the second photoelectric converters are arranged alternately in a column direction along each column of the pixel array,
      a first output line in the column direction and to which the first color voltage signals are output, and
      a second output line in the column direction and to which the second color voltage signals are output;
   an optical system that forms an image on an image sensing plane of the sensor; and
   a signal processor that processes a signal output from the sensor to generate image data,
   wherein the pixel array is driven to perform in parallel:
      a first operation to output the first color voltage signals which depend on charges of 2M or 2M+1 (M being a positive integer) of the first photoelectric converters which are arranged in the column direction to the first output line at one time, and
      a second operation to output the second color voltage signals which depend on charges of 2M or 2M+1 of the second photoelectric converters which are arranged in the column direction to the second output line at one time.

* * * * *